United States Patent [19]
Kojima et al.

[11] Patent Number: 5,530,886
[45] Date of Patent: Jun. 25, 1996

[54] OBJECT RECOGNITION APPARATUS USING A HIERARCHICAL NETWORK OF RECOGNITION UNITS

[75] Inventors: Yoshihiro Kojima, Kobe; Susumu Maruno, Osaka; Toshiyuki Kohda, Nara; Yasuharu Shimeki, Suita, all of Japan

[73] Assignee: Matsushita Electric Industrial Co., Ltd., Kadoma, Japan

[21] Appl. No.: 395,200

[22] Filed: Feb. 27, 1995

Related U.S. Application Data

[63] Continuation of Ser. No. 901,575, Jun. 19, 1992, abandoned.

[30] Foreign Application Priority Data

Jun. 27, 1991 [JP] Japan .................................. 3-156547
Jan. 23, 1992 [JP] Japan .................................. 4-010358

[51] Int. Cl.⁶ .................................................. G06K 9/66
[52] U.S. Cl. .................. 395/800; 395/24; 364/232.91; 364/275.9; 364/DIG. 1
[58] Field of Search ............... 395/800, 24; 364/232.91, 364/275.9, DIG. 1

[56] References Cited

U.S. PATENT DOCUMENTS

| | | | |
|---|---|---|---|
| 5,255,342 | 10/1993 | Nitta ............................................. | 395/2 |
| 5,263,107 | 11/1993 | Ueda et al. ................................. | 382/14 |
| 5,265,224 | 11/1993 | Maruno ....................................... | 395/24 |

FOREIGN PATENT DOCUMENTS 0374604  6/1990  European Pat. Off. .

OTHER PUBLICATIONS

S. Maruno/Computer World '90, vol. II/Nov. 1990/pp. 202–209.
R. P. Lippman et al/IEEE 1st Int'l Conference on Neural Networks/Jun. 1987/pp. IV–417–IV–426.
S. Maruno et al/IEEE Engineering in Medicine & Biology Society 10th Annual Int'l Conference, vol. 10/Nov. 1988/pp. 1590–1591.
Lippman et al., IEEE 1st International Conference on Neural Networks, Jun. 1987, pp. IV 417–IV 426.

*Primary Examiner*—Alyssa H. Bowler
*Assistant Examiner*—John Harrity
*Attorney, Agent, or Firm*—Jones, Tullar & Cooper

[57] ABSTRACT

A recognizing and judging apparatus for a learning and recognizing processing to be effectively performed in a short period of time, the apparatus including a plurality of recognition units in a multi-layered hierarchical network structure with one or more path output terminals of the recognition units of an upper layer being connected with one or more path input terminals of the recognition units of a lower layer. The recognition unit comprises a vector signal input structure for inputting a plurality of input signals for showing characteristics of an object to be recognized, a path signal transmitting information computing structure for converting an input signal vector from the vector signal input structure into a path signal transmitting information and a path signal transmitting structure having one or more path input terminals for inputting a path signal and one or more path output terminals for outputting the path signal to transmit the path signal from the path input terminals to the path output terminals according to the path signal transmitting information.

12 Claims, 13 Drawing Sheets

OBJECT RECOGNITION APPARATUS USING A HIERARCHICAL NETWORK OF RECOGNITION UNITS

This is a continuation of application Ser. No. 07/901,575 filed on Jun. 19, 1992, now abandoned.

BACKGROUND OF THE INVENTION

Field of the Invention

The present invention relates to an apparatus for recognizing and judging an object according to various characteristic data of the object.

Description of the Related Art

As a prior art recognizing and judging apparatus, there is known, for example, what was proposed by T. Kohonen in "Learning Vector Ouantization for Pattern Recognition" Helsinki University of Technology, Report TKK-F-A601 (Nov. 1986).

FIG. 1 is block diagram illustrating a prior art recognizing and judging apparatus of this type. The recognizing and judging apparatus comprises a template storing section 131 for storing templates for each category of input signal patterns prepared in advance, a template comparator 132 for comparing an input signal pattern inputted from a signal input terminal 133 with all the templates and for outputting a recognition result to a signal output terminal 134 of the template comparator 132, and a learning device 135 for modifying the templates according to a teacher signal inputted from a teacher signal input terminal 136.

In operation, a series of signals representative of an object to be recognized are inputted from the signal input terminal 133 to the template comparator 132. The template comparator 132 reads out all the templates Ti ($1 \leq i \leq p$: p is a number of the templates) to compare with a pattern of the inputted signal and to select a template having the closest similarity, i.e. normally one having the smallest error, and outputs the category number (type number of the object to be recognized) to which the template belongs, as a recognition result of the pattern of the inputted signals to the signal output terminal 134. If the output result is incorrect, the category number of a template to which the pattern of the inputted signals should belong is inputted from the teacher signal input terminal 136 as a teacher signal to the learning device 135 thereby modifying an appropriate template stored in the template storing section 131 so that a correct recognition result is outputted. Thus a learning is carried out and the recognition percentage is improved by modifying the templates according to recognition results.

In the recognizing and judging apparatus structured as described above, however, because it is necessary to compare a pattern of an inputted signal pattern with all the templates stored in the template storing section 131 to calculate an error when a pattern of an unknown input signal is to be recognized, it takes a very long period of time to make comparisons.

Furthermore, because the recognition percentage generally improves when the number of templates is increased, the template storing section 131 having a plurality of templates provided for one kind of category (object to be recognized) is used in the prior art recognizing and judging apparatus. Accordingly, the prior art recognizing and judging apparatus has such disadvantages that the more the number of categories to be recognized increases, the more the number of templates provided in the template storing section 131 increases and as a result, because the time necessary for recognition takes much long time, real-time processing cannot be performed.

The prior art recognizing and judging apparatus has still another disadvantage that since the learning of the prior art recognizing and judging apparatus is carried out by a user himself by modifying the templates, it takes a very long time for the user to perform the learning process.

SUMMARY OF THE INVENTION

Accordingly, it is an object of the present invention to overcome the aforementioned disadvantages by providing a recognizing and judging apparatus that enables learning and recognizing processing to be effectively performed in a short period of time.

The recognizing and judging apparatus of the present invention includes a plurality of recognition units in a multi-layered hierarchical network structure by connecting one or more path output terminals of the recognition units of an upper layer with one or more path input terminals of the recognition units of a lower layer, the recognition unit comprising:

vector signal input means for inputting a plurality of input signals which show characteristics of an object to be recognized;

path signal transmitting information computing means for converting an input signal vector from the vector signal input means into a path signal transmitting information; and path signal transmitting means having one or more path input terminals for inputting a path signal and one or more path output terminals for outputting the path signal to transmit the path signal from the path input terminals to the path output terminals according to the path signal transmitting information, In the recognizing and judging apparatus of the present invention, the path signal transmitting information computing means is provided with a vector quantizer for converting the input signal vector to the path signal transmitting information by performing vector-quantization oil the input signal vector from the vector signal input means, and the path signal transmitting means is provided with path input means having one or more path input terminals for inputting the path signal, path output means having one or more path output terminals for outputting the path signal and switch means for switching the connection of the path input terminals of the path input means and the path output terminals of the path output means according to the path signal transmitting information.

In the recognizing and judging apparatus of the present invention, the path signal transmitting information computing means is provided with path load information computing means for converting the input signal vector from the vector signal inputting means into a path load information, and the path signal transmitting means comprises path input means having one or more path input terminals for inputting the path signal, path output means having one or more path output terminals for outputting the path signal and path load means for changing the strength of the connection between the path input terminals of the path input means and the path output terminals of the path output means according to the path signal inputted from the path input means and the path load information.

BRIEF DESCRIPTION OF THE DRAWINGS

The object and features of the present invention will become more apparent from the following description taken in conjunction with the preferred embodiments thereof with reference to the accompanying drawings, throughout which like parts are designated by like reference numerals, and wherein.

DETAILED DESCRIPTION OF PREFERRED EMBODIMENTS

Figure 1:
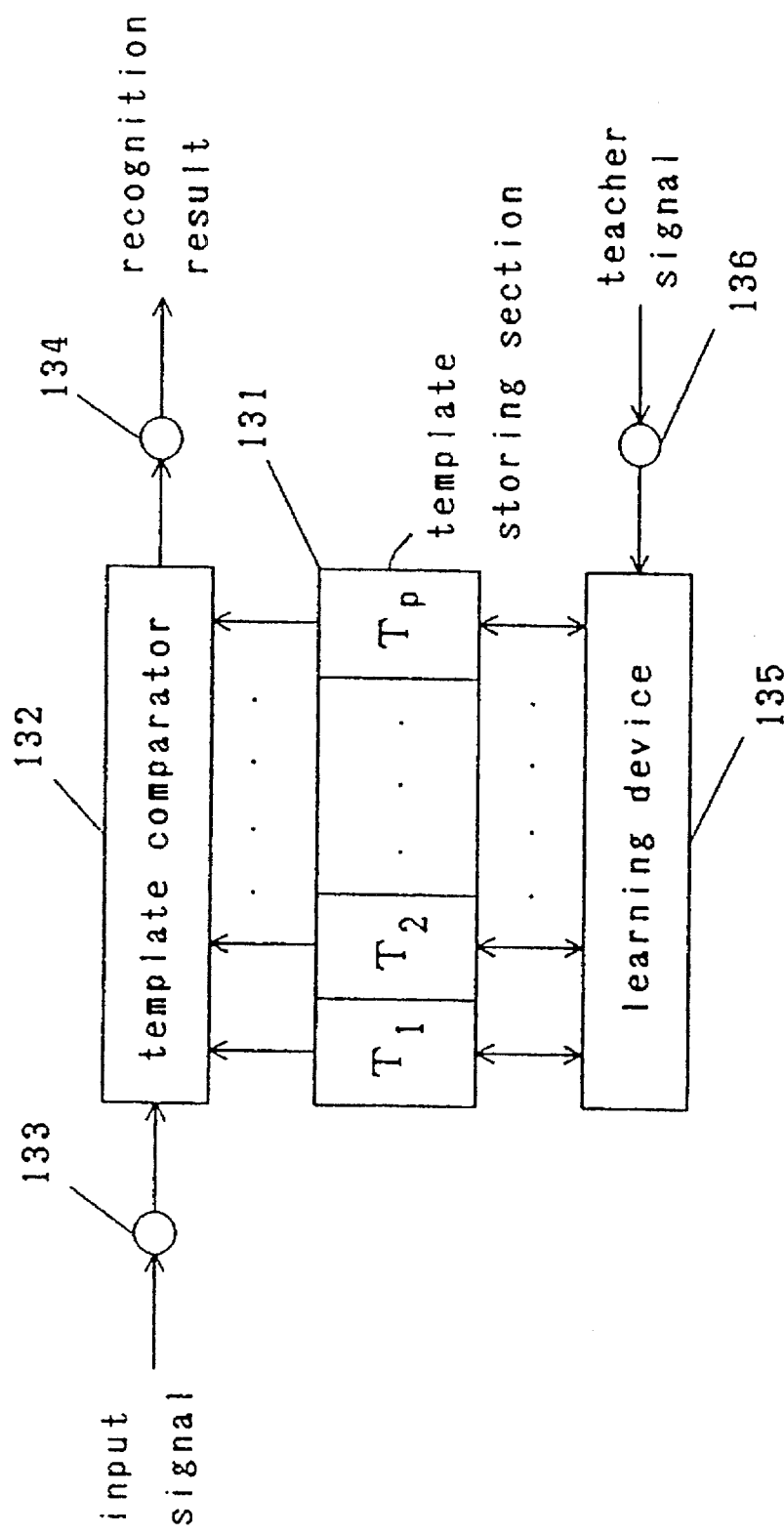
FIG. 1 is a block diagram of a conventional recognizing and judging apparatus.
Figure 2:
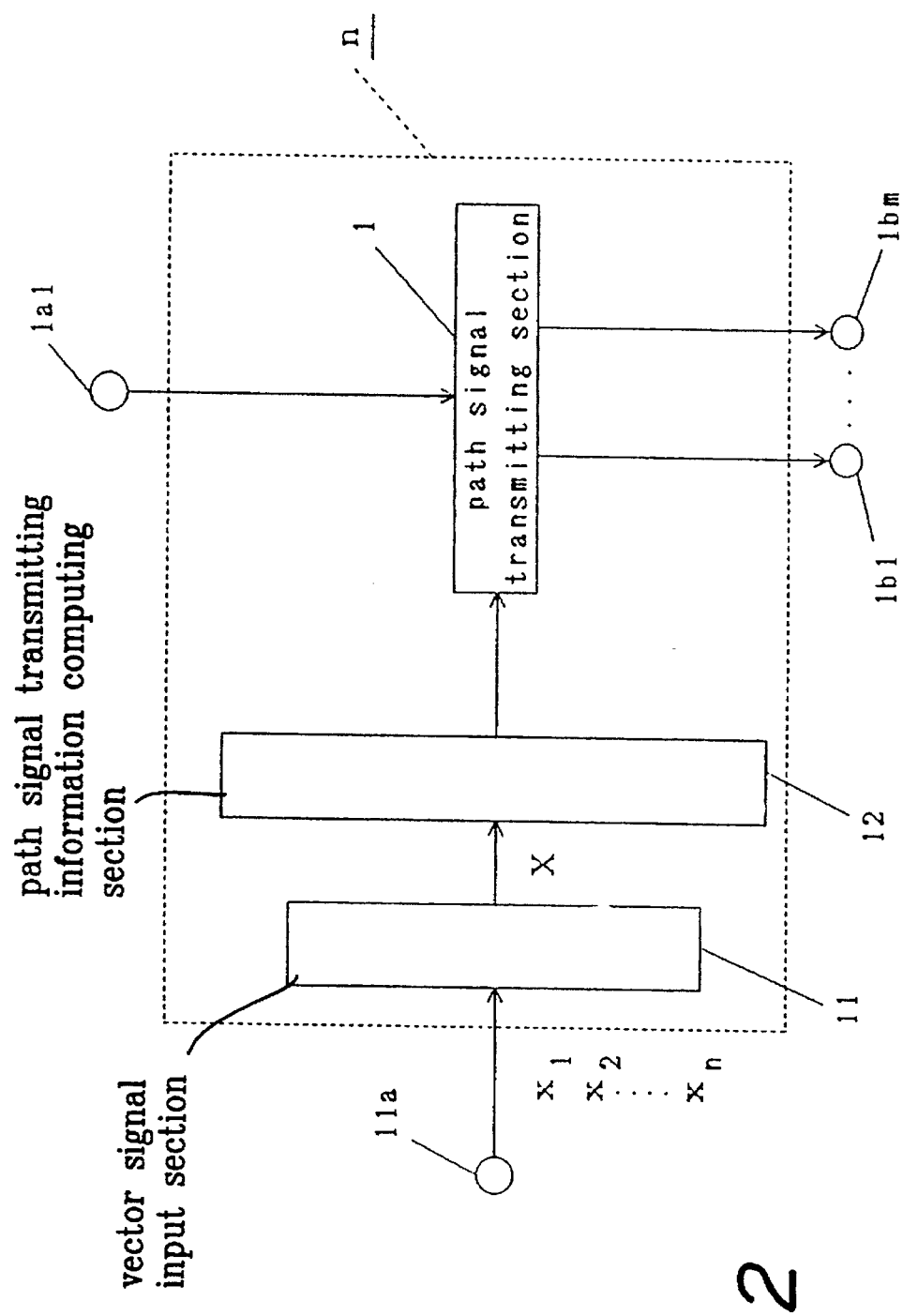
FIG. 2 is a block diagram of a recognition unit according to a first embodiment of the present invention.

Referring now to the drawings, preferred embodiments of the present invention will be described in detail. FIG. 2 is a block diagram showing a first embodiment of a recognition unit used in a recognizing and judging apparatus of the present invention. The recognition unit of this embodiment comprises a vector signal input section 11 for inputting a plurality of characteristic data x1, x2 ... of a pattern of input signals by putting them into one as an input signal vector X through a vector signal input terminal 11a, a path signal transmitting information computing section 12 for converting the input signal vector X into path signal transmitting information, a path input terminal 1a1 and path output terminals 1b1–bm which are connected to one another when a plurality of recognition units are combined to constitute a hierarchical network, and a path signal transmitting section 1 for transmitting path signals from the path input terminal 1a1 to the path output terminals 1b1 –1bm based on the path signal transmitting information.

Figure 3:
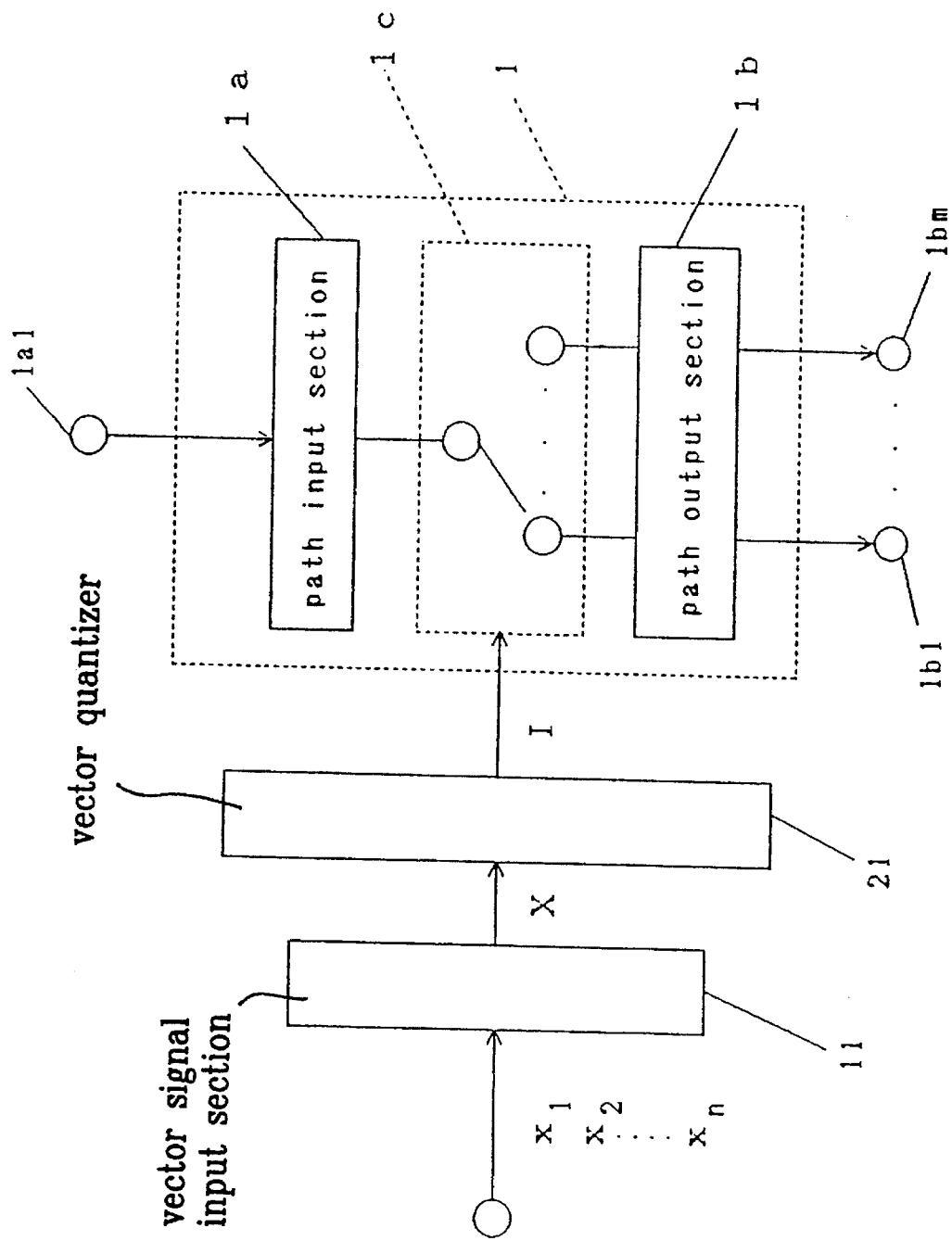
FIG. 3 is a block diagram of a recognition unit according to a second embodiment of the present invention.

FIG. 3 is a block diagram showing a second embodiment of a recognition unit used in the recognizing and judging apparatus of the present invention. According to the present embodiment, the path signal transmitting information computing section 12 in the aforementioned embodiment is structured by a vector quantizer 21 and the path signal transmitting section 1 comprises a path input section 1a having one path input terminal 1a1, a path output section 1b having m path output terminals 1b1–1bm and 8 switch 1c. Here, the vector quantizer 21 converts the input signal vector X into path selecting information I, which is the path signal transmitting information, by vector-quantizing the input signal vector X. The path input section 1a inputs path signals via one path input terminal 1a1. The path output section 1b outputs path signals via any one of m path output terminals 1b1 through 1bm. The switch 1c switches the connection between the path input terminal 1a1 and the path output terminals 1b1 through 1bm based on the path selecting information I.

Figure 4:
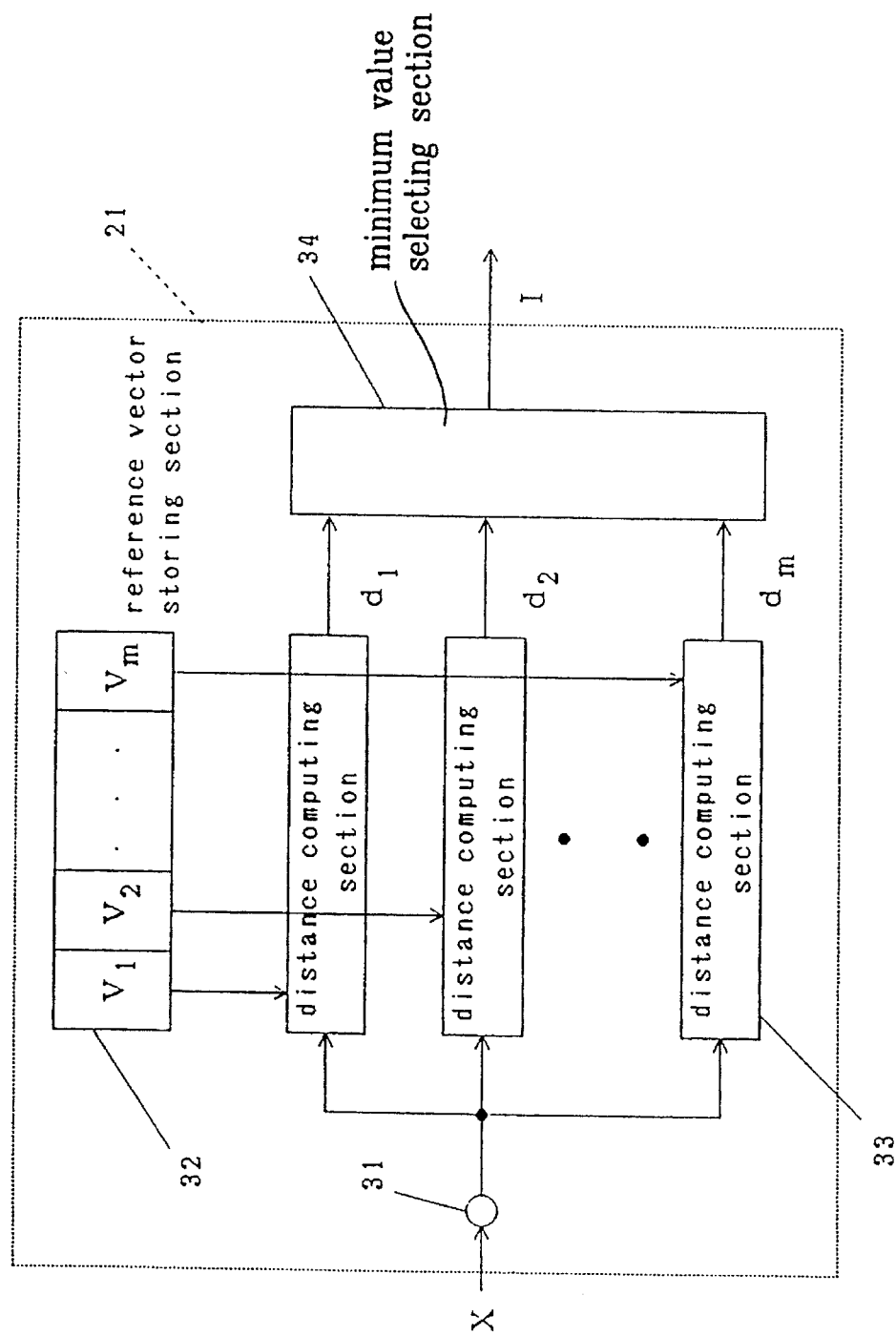
FIG. 4 is a block diagram showing a first embodiment of a vector quantizer in the embodiment in FIG. 3.

FIG. 4 is a block diagram showing a first embodiment of the vector quantizer 21 in the aforementioned recognition unit. The vector quantizer 21 of this embodiment comprises an input section 31 for inputting an input signal vector, a reference vector storing section 32 for storing m reference vectors indicating a representative value of an input signal vector, distance computing sections 33 for computing distances between all the reference vectors in the reference vector storing section 32 and an input signal vector and a minimum value selecting section 34 for selecting a minimum value among distances outputted from the distance computing sections 33.

Operation of the recognition unit structured as described above will now be described. The vector signal input section 11 puts a series (n number) of characteristic data $x_k$ ($1 \leq k \leq n$) of an object to be recognized together via thee vector signal input terminal 11a to input as input signal vector X as shown in equation (1) and outputs X to the vector quantizer 21.

$$X=(x_1, x_2, \ldots, x_n) \quad (1)$$

In the vector quantizer 21, the input section 31 initially receives X and outputs X to m distance computing sections 33. Each distance computing section 33 reads out a reference vector $V_i$ ($1 \leq i \leq m$, m: the number of reference vectors, i.e. the number of levels of quantization) indicating a representative value of the input signal vector X stored in the reference vector storing section 32 to compute a distance $d_i$ between X and $V_i$ as shown by equation (2)

$$d_i = \|X - V_i\|^2 \quad (1 \leq i \leq m) \quad (2)$$

and outputs the result to the minimum value selecting section 34. In the minimum value selecting section 34, the distances $d_i$ ($1 \leq i \leq m$) between X and all the reference vectors $V_i$ computed in the m distance computing sections 33 are compared and index I of a reference vector $V_1$ with which the value of the distance is a minimum is outputted to the path signal transmitting section 1 as a path selecting information.

In the path signal transmitting section 1 on the other hand, a path signal transmitted from an upper layer recognition unit is inputted to the path input section 1a via the path input section 1a1. The switch 1c switches the connection between the path input terminal 1a1 and the path output terminals 1b1 through 1bm of the path output section 1b based on the path selecting information I outputted from the vector quantizer 21. That is, the path signal inputted to the path input section 1a is transmitted to the path output terminal 1b1 when the path input terminal 1a1 and the path output terminal 1b1 are connected. The path output section 1b outputs the path signal to a lower layer recognition unit connected to which it is, via the path output terminal 1b1. In other words, the same number of recognition units with the number of levels of quantization m of the vector quantizer 21 of one recognition unit are provided in the lower layer thereof and the path signal is transmitted to one of the recognition units by the switch 1c.

Thus the recognition unit of the present embodiment puts together the characteristic vector data of the object to be recognized inputted to the vector signal input section 11 as input signal vector X and converts it into a path selecting information I by vector-quantizing to m levels by the vector quantizer 21. Then, based on the path selecting information I, the recognition unit switches the switch 1c in the path selecting section 1 to transmit the path signal from the upper layer to the lower layer by transmitting the path signal from the upper layer recognition unit to an I-th recognition unit among a group of m recognition units in the lower layer.

By the way, the distance $d_i$ between two vectors needs not be such an Euclidean distance as expressed by equation (2), but may be such a distance in a city as expressed by equation (3).

$$d_i=|X-V_i|(1\leq i\leq m) \qquad (3)$$

Figure 5:
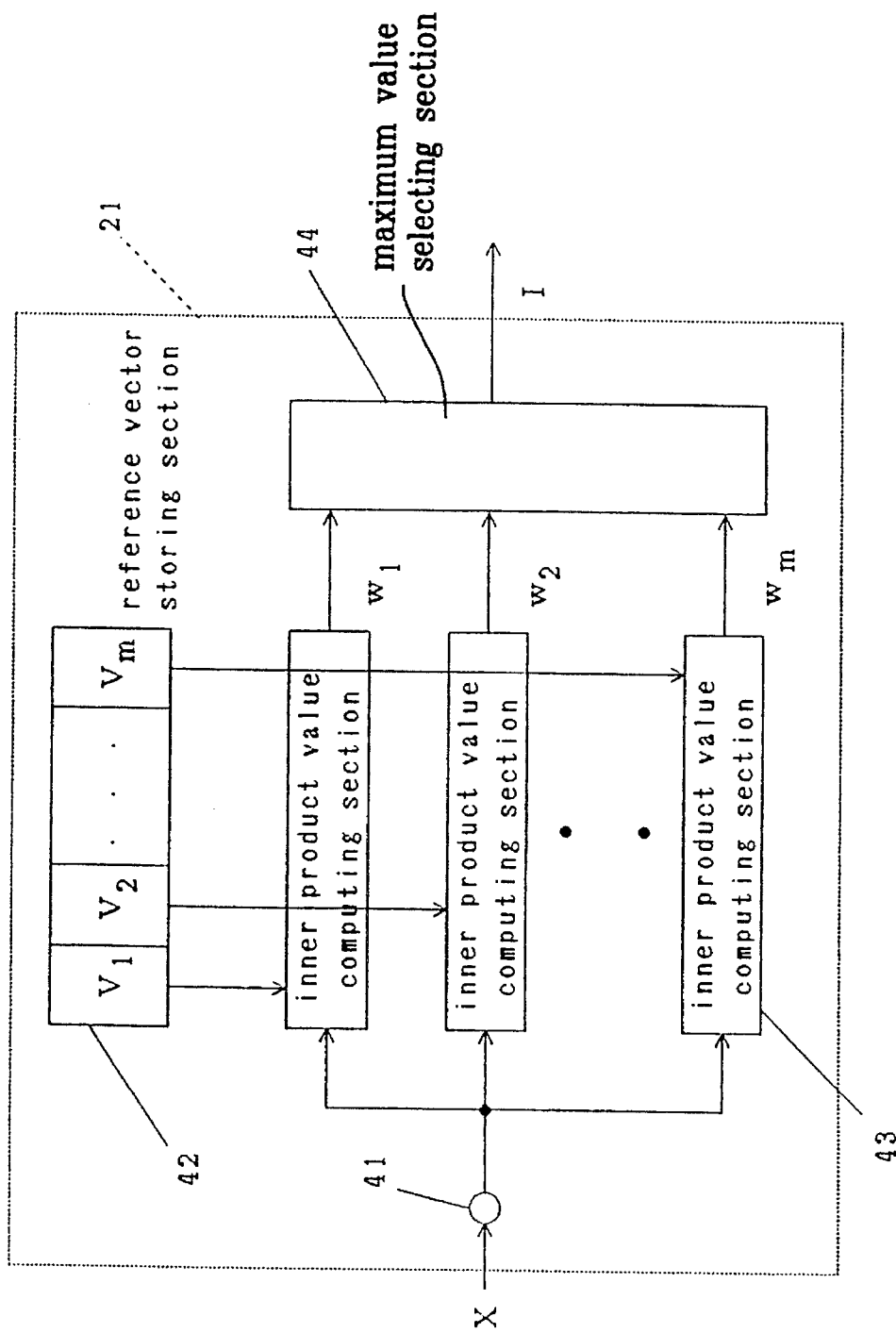
FIG. 5 is a block diagram showing a second embodiment of the vector quantizer in the embodiment in FIG. 3.

FIG. 5 is a block diagram showing a second embodiment of the vector quantizer 21 in the second embodiment of the recognition unit in FIG. 3. The vector quantizer 21 of this embodiment comprises an input section 41 for inputting input signal vector X, a reference vector storing section 42 for storing m reference vectors indicating a representative value of the input signal vector, inner product value computing sections 43 for computing inner product values of all the reference vectors in the reference vector storing section 42 and the input signal vector and a maximum value selecting section 44 for selecting a maximum value among the output values outputted from the inner product value computing sections 43.

In operation, the input section 41 initially inputs input signal vector X and outputs X to the m inner product computing sections 43. Each of the inner product value computing sections 43 reads out a reference vector $V_i$ ($1\leq i \leq m$, m: the number of reference vectors, i.e. the number of levels of quantization) indicating a representative value of the input signal vector X stored in the reference vector storing section 42 to compute an inner product value $w_i$ of X and $V_i$ as shown by equation (4) and outputs the result to the maximum value selecting section 44.

$$w_i=X\cdot V_i(1\leq i\leq m) \qquad (4)$$

the maximum value selecting section 44 compares the inner product value $w_i$ ($1\leq i\leq m$) of X and all the reference vectors V$hd$ i computed in the m inner product value computing section 43 and outputs index I of a reference vector $V_1$ with which the value of the inner product becomes the maximum to the path signal transmitting section 1 as a path selecting information.

Thus, the vector quantizer of the second embodiment performs vector-quantization by computing inner products of the input signal vector and the reference vectors.

Figure 6:
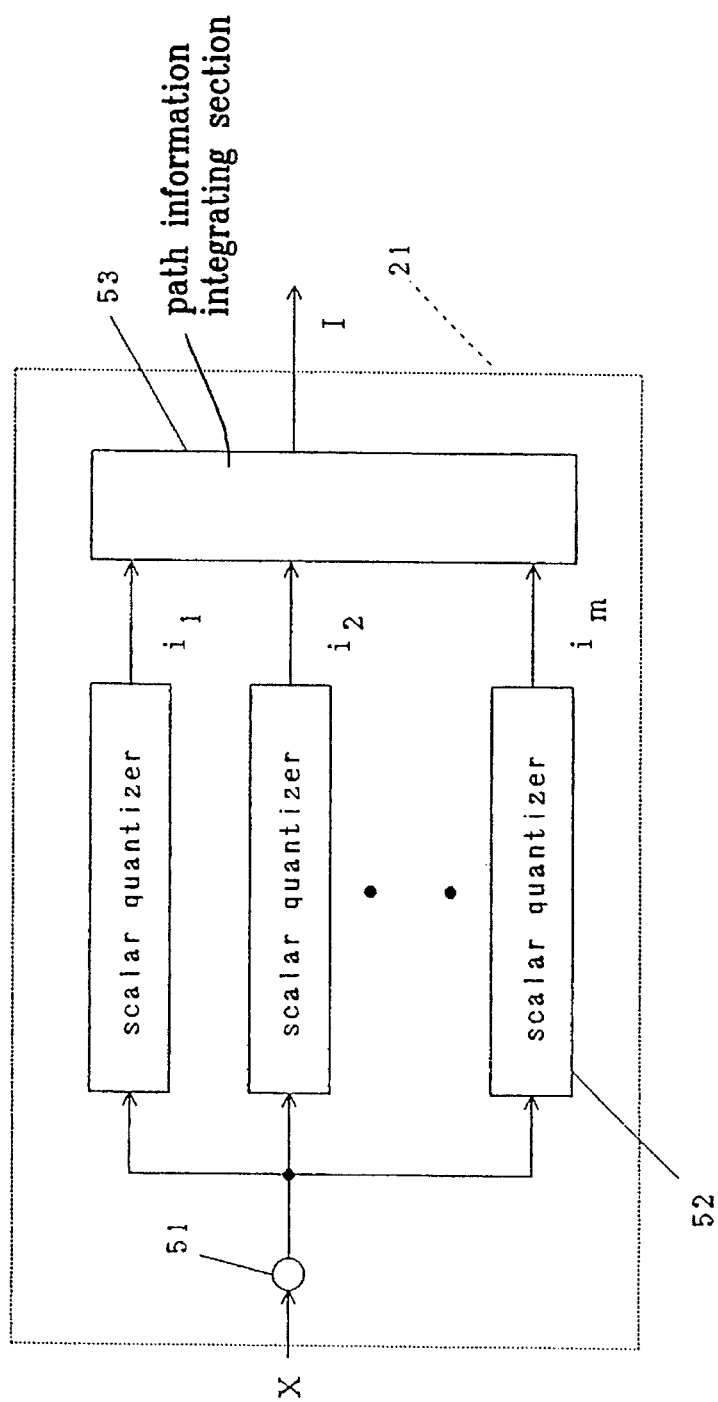
FIG. 6 is a block diagram showing a third embodiment of the vector quantizer in the embodiment in FIG. 3.

FIG. 6 is a block diagram showing a third embodiment of the vector quantizer in the second embodiment of the recognition unit in FIG. 3. The vector quantizer 21 of this embodiment comprises an input section 51 for inputting an input signal vector, scalar quantizers 52 for quantizing the input signal vector (inputted characteristic vector data) per each dimension and for outputting an index of a quantized output signal in each dimension, and a path information integrating section 53 for producing path selecting information I from all the indexes obtained from the plurality of scalar quantizers.

In operation, the input section 51 first inputs input signal vector X and outputs X to the n scalar quantizers 52. Each of the scalar quantizers 52 samples and scalar-quantizes each element $x_k$ of the input signal vector (inputted characteristic vector data) and outputs an index $i_k$ of a quantized output signal $yi_k$ ($1\leq i_k \leq m$, m: the number of levels of quantization) to the path information integrating section 53. Here, the scalar quantization is an operation for converting characteristic data $x_k$ which is a continuous value to m discrete values $yi_k$ using a criterion that corresponds to the templates. That is, it is an operation for giving a discrete value of $yi_k$ to $x_k$ which exists in $zi_{i-1}\leq X_k\leq z_i$ (where z∈ R: real number). The path information integrating section 53 integrates n indexes $i_1 i_2 \ldots i_n$ obtained from each of the scalar quantizers 52 into one, to produce path selecting information I and outputs it to the path signal transmitting section 1. Here, the path selecting information I integrates each index by performing a computation as shown by equation (5), for example.

$$I=m^{(n-1)}\cdot i_1+m^{(n-2)}\cdot i_2+\ldots \qquad (5)$$
$$=m\cdot i_{n-1}=i_n$$

Thus, the vector quantizer of the third embodiment scalar-quantizes the input signal vector per each element thereof and performs the vector-quantization by integrating its output.

Figure 7:
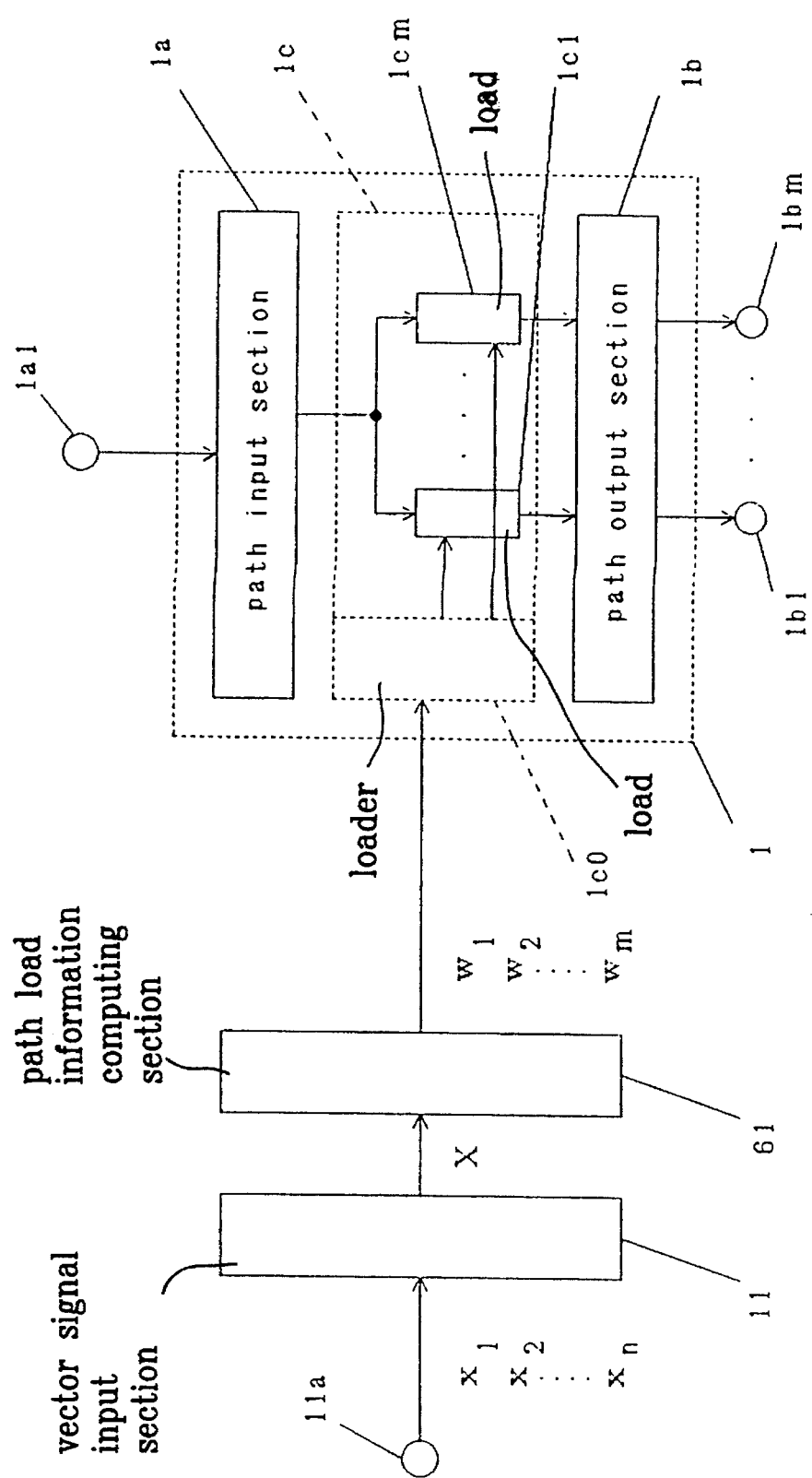
FIG. 7 is a block diagram of a recognition unit according to a third embodiment of the present invention.

FIG. 7. is a block diagram of a third embodiment of a recognition unit used in the recognizing and judging apparatus of the present invention. In the present embodiment, the path signal transmitting information computing section 12 in FIG. 2 is structured by a path load information computing section 61 and the path signal transmitting section 1 is structured by a path input section 1a having one path input terminal 1a1, a path output section 1b having m path output terminals 1b1 through 1b in and a path load section 1c. Here, the path load information computing section 61 converts input signal vector X into a path load information which is a path signal transmitting information. The path input section 1a receives a path signal via one path input terminal 1a1. The path output section 1b outputs the path signal via m path output terminals 1b1 through 1bm. The path load section 1c applies weight to the path signal inputted from the path input section 1a by loads 1c1 through 1c m. A loader 1c0 changes loads 1c1 through 1 cm based on the path signal and the path load information.

Figure 8:
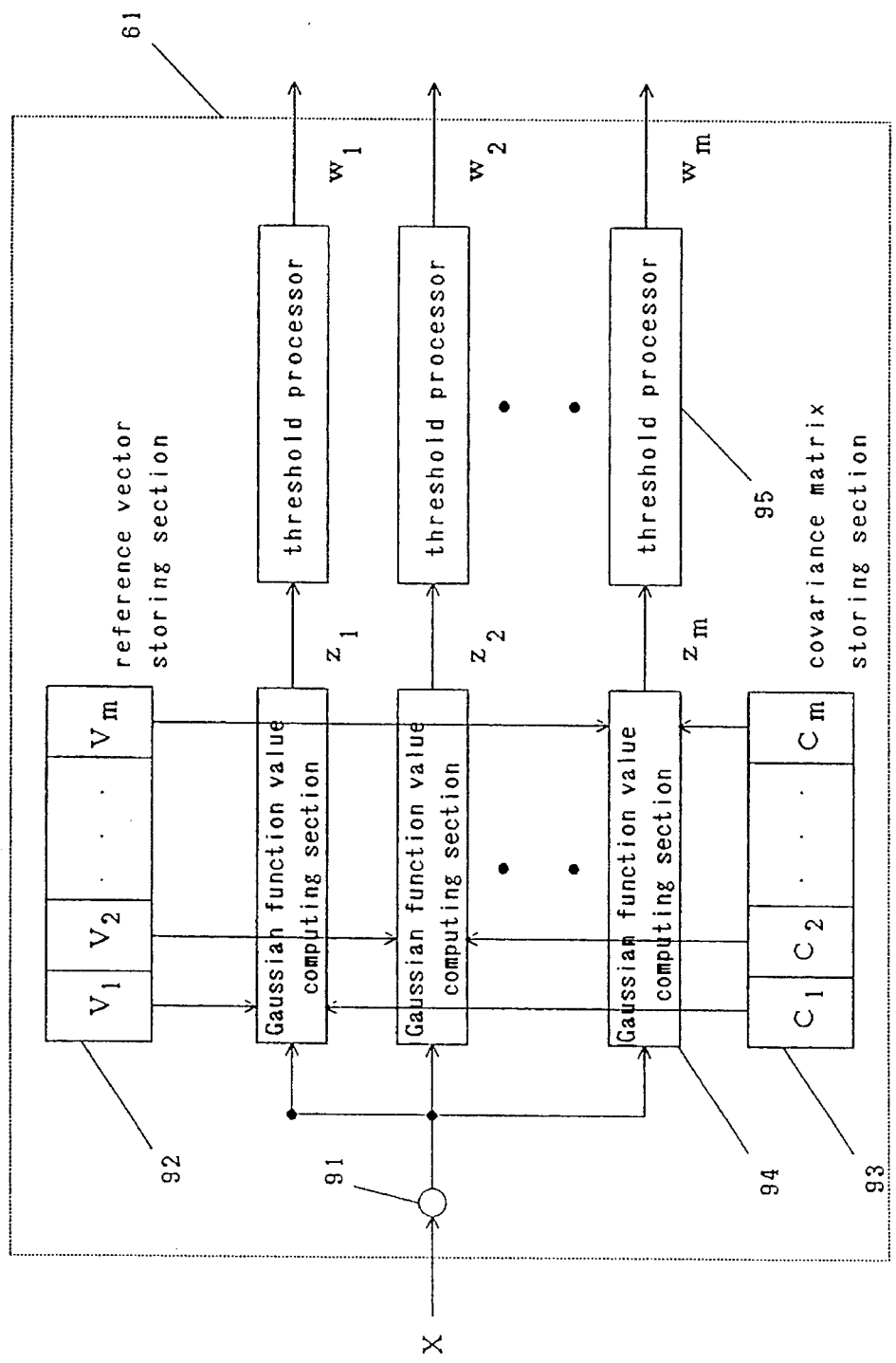
FIG. 8 is a block diagram showing a first embodiment of a path load information computing section in the third embodiment in FIG. 7.

FIG. 8 is a block diagram showing a first embodiment of the path load information computing section 61 in the recognition unit in FIG. 7. In this embodiment, the path load information computing section 61 comprises an input section 71 for inputting an input signal vector, a reference vector storing section 72 for storing m reference vectors indicating a representative value of an input signal vector, inner product value computing sections 73 for computing inner product values of all the reference vectors in the reference vector storing section 72 and the input signal vector and threshold processors 74 for performing threshold processing to limit the inner product values obtained in the inner product value computing sections into a certain value range.

In operation, the vector signal input section 11 puts together a series (n number) of characteristic data $x_k$ ($1 \leq k \leq n$) of an object to be recognized via the vector signal input terminal 11a to input as input signal vector X as shown by equation (6) and outputs X to the path load information computing section 61.

$$X=(x_1, x_2, \ldots, x_n) \quad (6)$$

In the path load information computing section 61, the input section 71 receives signal vector X and outputs X to the m distance computing sections 73. Each of the inner product value computing sections 73 reads out a reference vector $V_i$ ($1 \leq i \leq m$, m: the number of reference vectors) indicating a representative value of the input signal vector X stored in the reference vector storing section 72 to compute an inner product value $z_i$ of X and $V_i$ as shown by equation (7) and outputs the result to each of the threshold processors 74.

$$z_i = X \cdot V_i (1 \leq i \leq m) \quad (7)$$

Each of the threshold processors 74 performs the threshold processing for limiting the output $z_i$ of the inner product value computing section 73 into a certain value range and outputs the result of each of the threshold processors to the path signal transmitting section 1 as path load information $w_i$ ($1 \leq i \leq m$). That is, the path load information $w_i$ may be expressed as shown by equation (8).

$$w_i = f(z_i)(1 \leq i \leq m) \quad (8)$$

Where, f(Zi) is a threshold value function representative of input/output characteristics of the threshold processors. For example, as a threshold value function that limits an output in a range of (0. 1), piecewise linear functions as shown in equation (9) (where, a is an arbitrary constant) or Sigmoid function (where, T, θ are arbitrary constants) shown by equation (10), may be used.

$$f(z) = 1 \quad \text{if } z > z_0 \quad (9)$$
$$= az \quad \text{if } z_0 < z < z_1$$
$$= 0 \quad \text{if } z < z_1$$

$$f(Z) = 1/(1+\exp(-z/T+\theta)) \quad (10)$$

In the path signal transmitting section I on the other hand, the path signal transmitted from an upper layer recognition unit is inputted to the path input section 1a via the path input section 1a1. The loads 1c1 through 1cm in the path load section 1c are weights applied to the path signal outputted via the path output terminals 1b1–1bm of the path output section 1b and the loader 1c0 changes those weights according to the path load information $w_i (1 \leq i \leq m)$ outputted from the path load information computing section 61 and to the path signal inputted from the path input section 1a. The path signal inputted from the path input section 1a is weighted by the loads 1c1 through 1cm and the weighted path signal is outputted to the lower layer recognition, which are units coupled to each other via the path output terminals 1b1 through 1bm by the path output section 1b. In other worsts, the same number of recognition units with the number of outputs of the path load information computing section 61 of one recognition unit, i.e. the number m of the path load informations, are connected to each other in the lower layer thereof.

Thus the recognition unit of the present embodiment puts together the characteristic vector data of an object to be recognized inputted to the vector signal input section 11 as input signal vector X and converts it to m path load informations $w_i$ by, the path load information computing section 61. Then, the recognition unit applies weight to the path signal from the upper layer recognition unit according to the path load information and the path signal and transmits the path signal from the upper layer to lower layer by outputting it to the lower layer group of m recognition units.

Figure 9:
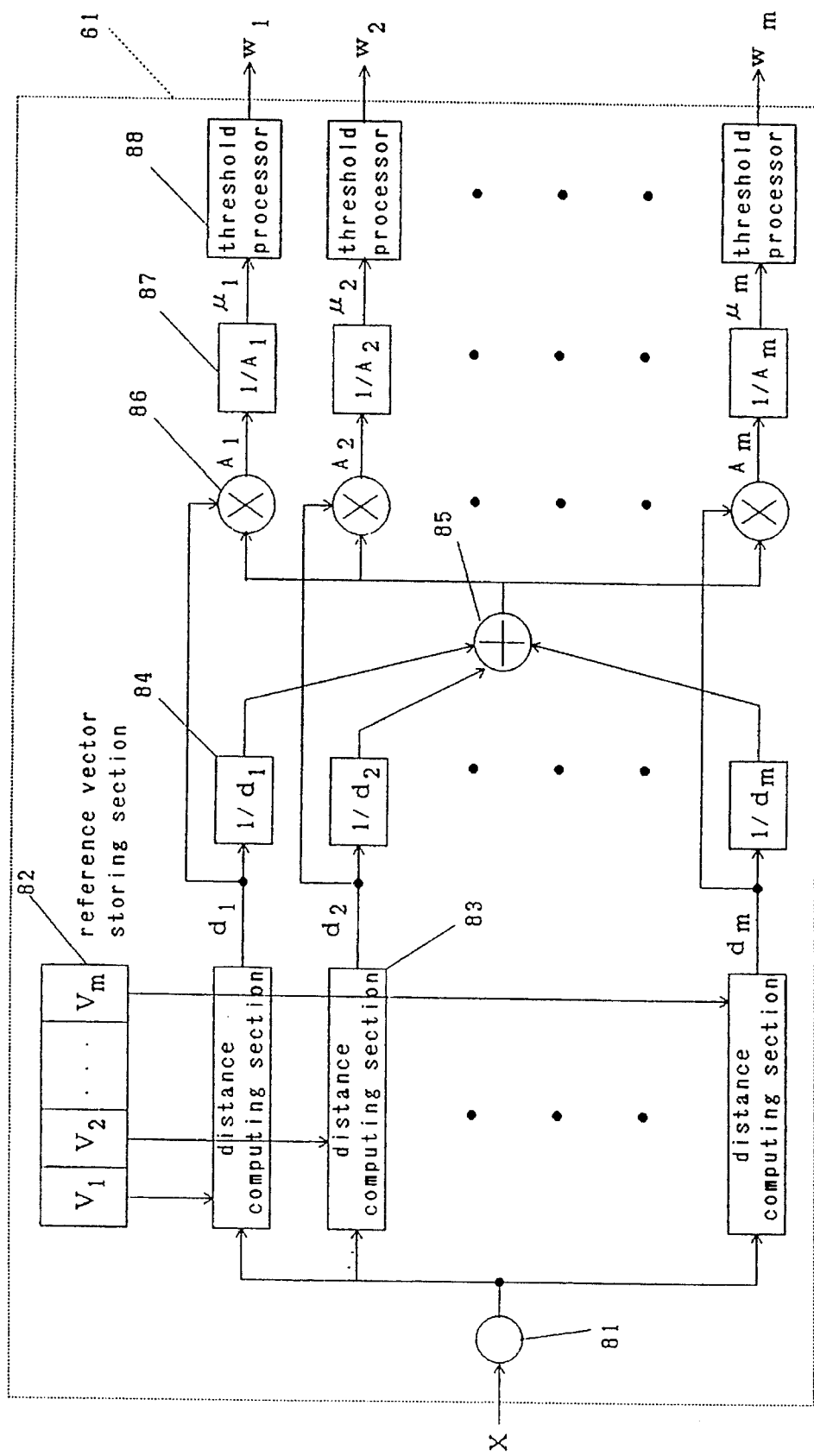
FIG. 9 is a block diagram showing a second embodiment of the path load information computing section in the third embodiment in FIG. 7.

FIG. 9 is a block diagram showing a second embodiment of the path load information computing section in the third embodiment in FIG. 7. In this embodiment, the path load information computing section 61 comprises an input section 81 for inputting an input signal vector, a reference vector storing section 82 for storing m reference vectors indicating a representative value of an input signal vector, distance computing sections 83 for computing distances between all the reference vectors in the reference vector storing section 82 and the input signal vector, dividers 84 for computing an inverse number of the output of the distance computing sections 83, an adder 85 for finding a sum of the outputs of each divider 84, multipliers 86 for multiplying the output of the adder 85 by the output of the distance computing sections 83, dividers 87 for computing an inverse number of the output of the multiplier 86 and threshold processors 88 for performing threshold processing for limiting the output value of each divider 87 into a certain value range, In operation, the input section 81 first receives input signal vector X and outputs X to the m distance computing sections 83. Each distance computing section 83 reads out a reference vector $V_i$ ($1 \leq i \leq m$, m: the number of reference vectors) indicating a representative value of the input signal vector X stored in the reference vector storing section 82 to compute a distance $d_i$ between X and $V_i$ as shown by equation (11) and outputs the result to each corresponding divider 84 and multiplier 86 (where, f is a real number satisfying f>1).

$$d_i = |X-V_i|^{2/(f-1)}(1 \leq i \leq m) \quad (11)$$

Each for the dividers 84 computes an inverse number of distance $d_i$ and outputs the result to the adder 85. The adder 85 computes a sum of all the outputs of the dividers 84 and inputs the result to the multipliers 86. Each of the multipliers 86 multiplies the outputs of each corresponding distance computing section 83 and the adder 85 and inputs the result to each of the dividers 87. Each of the divider 87 computes an inverse number of the output of each multiplier 86 and outputs the result to each threshold processor 88. Each of the threshold processors 88 performs threshold processing for limiting the output of each divider 87 into a certain value range and outputs the result of each threshold processor 88 to the path signal transmitting section 1 as path load information $w_i$ ($1 \leq i \leq m$). That is, the path load information $w_i$ may be expressed as equation (12).

$$w_i = f(\mu_i) \ (1 \leq i \leq m) \quad (12)$$
Here,
$$\mu_i = \frac{1}{\sum_{j=1}^{m} (d_i/d_j)}$$

Where, $f(\mu_i)$ is a threshold value function representative of input/output characteristics of the threshold processors, and as the threshold value function for limiting the output into a range of (0, 1), piecewise linear functions as shown in equation (9) or Sigmoid function shown in (10) may be used similarly with the embodiment of FIG. 8. From equation (12), the path load information may be changed by changing parameter f of the distance expressed by equation (11), as follows. If f approaches 1, for example, a value of one path load information becomes greater and other values become very small. On the other hand, f is greater, values of all the path load informations become an average value. Thus, the present embodiment allows setting the value of the path load informations to optimum value by manipulating parameter f.

Figure 10:
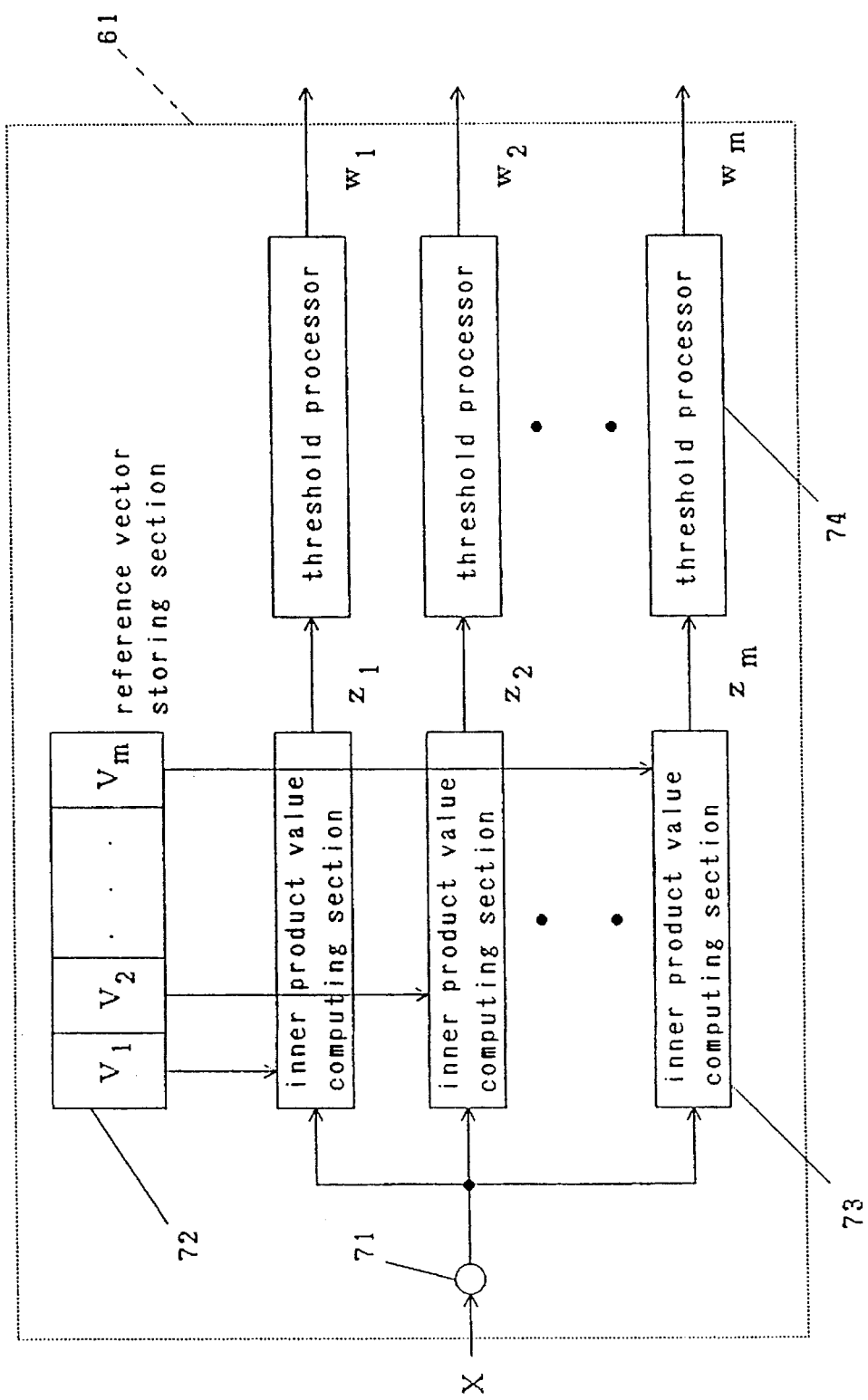
FIG. 10 is a block diagram showing a third embodiment of the path load information computing section in the third embodiment FIG. 7.

FIG. 10 is a block diagram showing a third embodiment of the path load information computing section 61 in the third embodiment of the recognition unit in FIG. 7 In this embodiment, the path load information computing section 61 comprises an input section 91 for inputting an input signal vector, a reference vector storing section 92 for storing m reference vectors indicating a representative value of an input signal vector, a covariance matrix storing section 93 for storing m covariance matrixes for indicating an extent of the input vector signal which corresponds to each reference vector, Gaussian function value computing sections 94 for converting the input signal vector into a value of probability density function having multi-dimensional Gaussian distribution using all the reference vectors stored in the reference vector storing section 92 and all the covariance matrixes stored in the covariance matrix storing section 93, and threshold processors 95 for limiting the output value of each Gaussian function value computing section 94 into a certain value range.

In operation, the input section 91 first receives input signal vector X and outputs X to the m Gaussian function value computing sections 94. Each of the Gaussian function value computing sections 94 reads out a reference vector $V_i (1 \leq i \leq m$, m: the number of reference vectors) indicating a representative value of the input signal vector X stored in the reference vector storing section 92 and reads out a covariance matrix $C_i$ ($1 \leq i \leq m$, m: the number the reference vectors) X stored in the covariance matrix storing section 93 to convert to a value of probability density function having multi-dimensional Gaussian distribution as shown by equation (13) (where, n is the element numbers of X and $V_i$) and outputs the result to each of the threshold value processors 95.

$$z_i (1 \leq i \leq m) \qquad (13)$$

$$z_i = \frac{\exp\{-(X - V_i)C_i^{-1}(X - V_i)^T/2\}}{(2\pi)^{n/2}|C_i|^{1/2}}$$

Then each threshold processor 95 performs the threshold processing for limiting the output $z_i$ of each Gaussian function computing section 94 into a certain value range and outputs the result thereof to the path signal transmitting section 1 as path load information $w_i$ ($1 \leq i \leq m$). That is, the path load information $w_i$ may be expressed as equation (14).

$$w_i = f(z_i)(1 \leq i \leq m) \qquad (14)$$

Where, f(zi) is a threshold value function representative of input/output characteristics of the threshold processors, and as the threshold value function for limiting the output in a range of (0, 1), piecewise linear functions as shown in equation (9) or Sigmoid function shown in (10) may be used similarly with the embodiment in FIG. 8.

By the way, the covariance matrix $C_i$ may be found by using the reference vectors $V_i$ and all input signal vectors used for designing those reference vectors, as shown in equation (15).

$$C_i = E[(X - V_i)^T(X - V_i)] \qquad (15)$$

Where, $E[(X+V_i)=(X-V_i)]$ is a computation of an expected value, $C_i$ is a positive symmetrical matrix, a diagonal element $c_{kk}$ is a variance of k-th element of the input signal vector and $c_{jk}$ (j=k) is a covariance of $x_j$ and $x_k$.

Thus, the present embodiment finds the path load information not just by the positional relationship of the reference vectors in the input signal vector space but also by considering a distribution state of the input signal vectors that corresponds to the reference vectors. Accordingly, although the computation for finding the path load information may become complex, the present embodiment allows for a decrease in the number of the reference vectors and a decrease in the storage capacity for the reference vectors.

Figure 11:
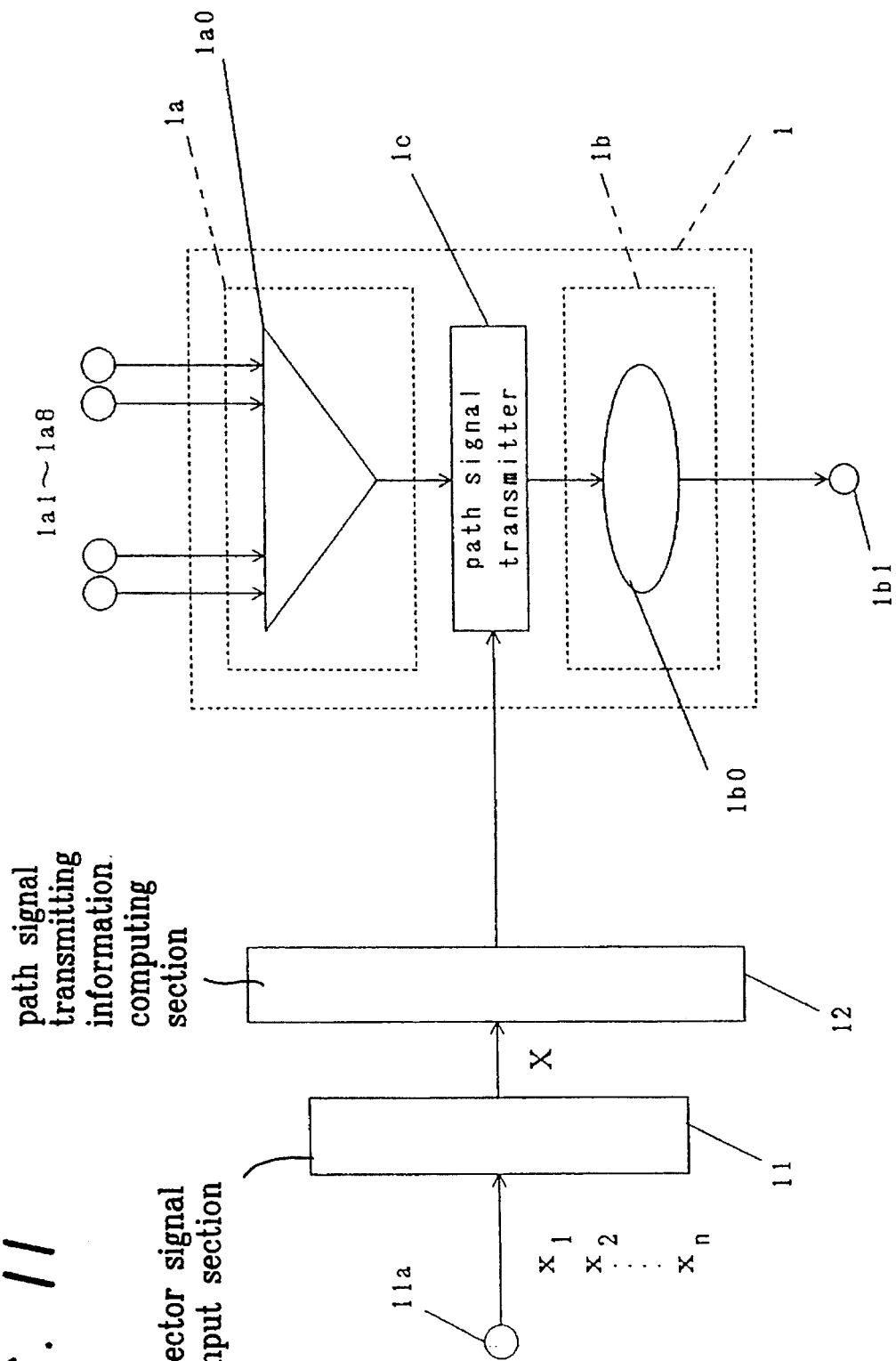
FIG. 11 is a block diagram of a recognition unit according to a fourth embodiment of the present invention.

FIG. 11 is a block diagram of a fourth embodiment of the recognition unit used in the recognizing and judging apparatus of the present invention. In this embodiment, the recognition unit comprises a path signal transmitting section comprising a path input section 1a having a plurality of path input terminals 1a1 through 1a8 for inputting a plurality of input signals and an adder 1a0 for adding these input signals, a path output section 1b having a threshold process or 1b0 for performing threshold processing on a path signal and one path output terminal 1b1 for outputting the path signal and a path signal transmitter 1c. The recognition unit also comprises the vector signal input section 11, the vector signal input terminal 11a and the path signal transmitting information computing section 12, the structure of which being the same as that of with the first embodiment of the recognition unit shown in FIG. 2.

In operation, the path signal transmitting section 1 receives path signals from eight upper layer recognition units via the path input terminals 1a1 through 1a8 of the path input section 1a. The adder 1a0 sums up those path signals and outputs the outcome to the path signal transmitter 1c. The path signal transmitter 1c determines how to output the path signal summed up by the adder 1a0 according to the path signal transmitting information. The path signal transmitter 1c has already been described in FIGS. 3 and 7, and either structures of the transmitter 1c in FIGS. 3 and 7 may be used for the path signal transmitter 1c in this embodiment. However, the path output section 1b has only one path output terminal in this embodiment, so the path signal transmitter 1c determines whether it should output the path signal according to path selecting information when the structure in FIG. 3 is used or changes the load for applying weight on the path signal according to the path load information and the path signal when the structure in FIG. 7 is used. The path signal transmitting information (path selecting information or path load information) is what, an input signal vector inputted from the vector signal input section 11 is converted to in the path signal transmitting information section 12 as described in FIG. 2(FIG. 3 or FIG. 4). Tile path output section 1b performs the threshold processing on the path signal outputted from the path signal transmitter 1c using the threshold processor 1b0 and outputs the path signal via the path output terminal 1b1 . For functioning of the threshhold processing, the piecewise linear functions shown in equation (9) and Sigmoid function shown in equation (10) may be used.

By the way, a modified unit of the recognition unit shown in FIG. 11 may be structured so that the path selection signal is set to "0" during "learning" and to "1" during "recognition" and the unit is not operated during the "learning" and is operated during "recognition." Or, another modified unit may be structured which uses no path selecting information but uses only the aforementioned adder 1a0 and the threshold processor 1b0.

Figure 12:
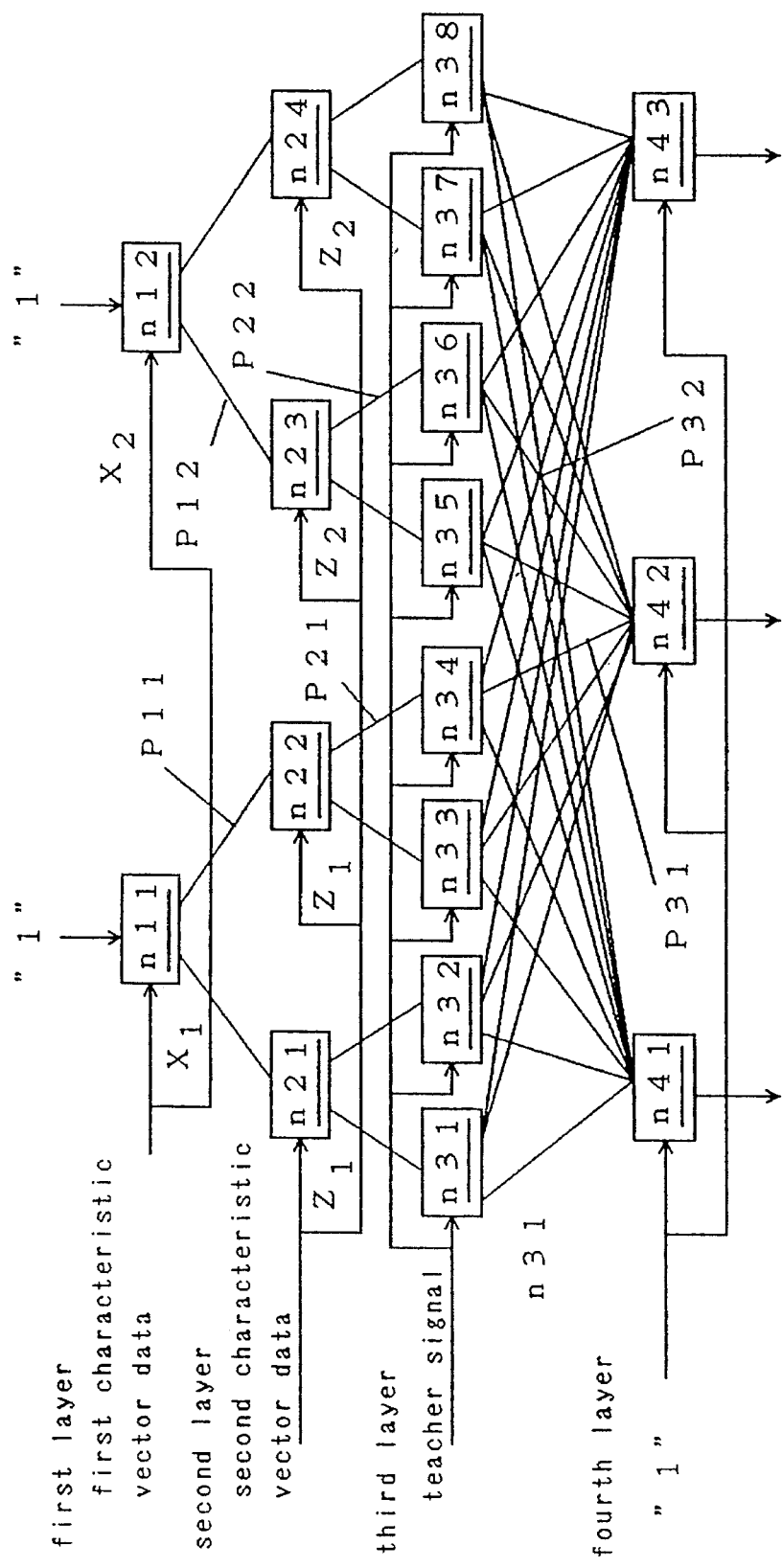
FIG. 12 is a block diagram of a recognizing and judging apparatus according to a first embodiment of the present invention.

FIG. 12 is a block diagram of a recognizing and judging apparatus according to a first embodiment of the present invention. The recognizing and judging apparatus of this embodiment divides an object to be recognized into two parts and based on two types of characteristic vector data, classifies the object into three categories for achieving a recognition. In the recognizing and judging apparatus, a network is constructed by connecting to one another a plurality of recognition units according to the present invention in multi-layered hierarchical structure. That is, for example, if the three letters 'A', 'B' and 'C' are to be recognized as the objects to be recognized, the first characteristic data in this case would be characteristic of the concentration and the second characteristic data would be directions of the lines of the letters. Moreover, the letters to be recognized are divided into half of right and left areas and the left half portion is dealt with by a network of recognition units n11, n21, n22, n31, n32, n33 and n34 and the right half portion is dealt with by a network of recognition units n12, n23, n24, n35, n36, n37 and n38.

Here a number of layers in the network is (a number of types of characteristic data +2) and therefore, the number of layers is four in this embodiment. Moreover, each recognition unit in the final layer corresponds to each category of the object. For example, recognition unit n41 corresponds to 'A', n42 to 'B' and n43 to 'C'. In this embodiment, one recognition unit of the fourth layer corresponds to one category and the number thereof is three. In this embodiment, the recognition unit as shown in FIG. 3 is used as recognition units n11–n12 and n21–n24 constituting the first and second layers, respectively and comprises the vector quantizer 21 shown in FIG. 4 for vector-quantizing characteristic vector data inputted from the vector signal input section 11 into two levels (i.e. m=2) and the path signal transmitting section 1 comprising the path input section 1a having one path input terminal 1a1, the path output section 1b having two, path output terminals 1b1 and 1b2 and the switch 1c.

The recognition unit provided with the path signal transmitting section 1 shown in FIG. 3 is also used as recognition units n31–n38 constituting the third layer and comprises here the vector quantizer 21 for vector-quantizing a teacher signal inputted from the vector signal input section 11 into three levels (i.e. m=3) and the path signal transmitting section 1 comprising the path input section 1a having one path input terminal 1a1, the path output section 1b having three path output terminals 1b1, 1b2 and 1b3 and the switch 1c.

The recognition unit as shown in FIG. 11 is used as recognition units n41–n43 constituting the fourth layer and as described before, the path input section 1a is structured by the adder 1a0 for adding input signals from eight path input terminals 1a1–1a8 and the path output section 1b is structured by the threshold processor 1b0 for performing threshold processing on a path signal.

Next, the learning operation of the recognizing and judging apparatus shown in FIG. 12 will be described exemplifying a case when an object to be recognized is a letter and letter data is discriminated into three categories using two types of characteristic vector data of the letter data. Here, the characteristic vector data is what a plurality of characteristic data of the letter data sampled from the reference letter data read by a scanner and the like using such a characteristic sampling method as mesh sampling method are put together as one vector data.

For example, if a first characteristic vector data is what $2n_1$ characteristic data $x_k$ ($1 \leq k \leq 2n_2$) whose characteristics are sampled out using $2n_1$ meshes by the mesh sampling are divided into two groups and each $n_1$ characteristic data are put together, the first characteristic vector data $X_1$ and $X_2$ may be expressed as:

$$X_1 = (x_1, x_2, \ldots x_{n1})$$

$$X_2 = (x_{n1+1}, x_{n1+2}, \ldots x_{2n1})$$

Also if a second characteristic vector data is what $2n_2$ characteristic data $z_k$ ($1 \leq k \leq 2n_2$) whose characteristics are sampled out using a characteristic sampling different from the aforementioned mesh sampling are divided into two groups and each $n_2$ characteristic data is put together in the same way as in the case of the mesh sampling, the second characteristic vector data $Z_1$ and $Z_2$ may be expressed as:

$$Z_1 = (z_1, z_2, \ldots z_{n2})$$

$$Z_2 = (z_{n2+1}, z_{n2+2}, \ldots z_{2n2})$$

Using now the characteristic vector data $X_1$, $X_2$, $Z_1$ and $Z_2$ of the reference letter, the learning operation of the recognizing and judging apparatus will be described.

"1" is initially given as a path signal to the path input terminal 1a1 of each of the recognition units n11 and n12 of the first layer. Moreover, the first characteristic vector data $X_1$ and $X_2$ of the letter data are inputted to the signal input terminals 11a of the vector signal input section 11 in those recognition units. The vector quantizer 21 in the recognition units n11 and n12 vector-quantizes the characteristic vector data into two levels to convert the characteristic vector data into a path selecting information for indicating to which path output terminal among terminals 1b1 and 1b2 the inputted path signal "1" should be transmitted. Here, as described before referring to FIG. 4, the distance computing section 33 in the vector quantizer 21 computes distances between two reference vectors stored in the reference vector storing section 32 and the characteristic vector data. Then the minimum values selecting section 34 compares sizes of those distances and outputs an index of the reference vector with which the value of the distance becomes smaller as a path selecting information to the path signal transmitting section 1. By the way, the types of reference vectors and the number of path output terminals are selected and determined beforehand as appropriately as possible in a range predictable by a designer (maker) of the system.

In the path signal transmitting section 1 of each recognition unit, the switch 1c switches the connection between the path input terminal 1a1 and the path output terminals 1b1 and 1b2 based on the path selecting information, and distributes the path signal inputted from the path input section 1a to either the path output terminal 1b1 or the path output terminal 1b2. The path output section 1b in each recognition unit outputs the path signal to the path input terminal 1a1 of the recognition unit of the second layer, which are connected to each other, through the intermediary of either the path output terminal 1b1 or the path output terminal 1b2. That is, in FIG. 12, path p11 is selected by the switch 1c according to the path selecting information obtained by vector-quantizing the characteristic vector data $X_1$ and path signal "1" inputted to the recognition unit n11 for covering the left half portion of the letter to be recognized is inputted to the path input terminal 1a1 of the recognition unit n22 of the second layer. In the same manner, path p12 is selected by the switch 1c according to the path selecting information obtained by vector-quantizing the characteristic vector data $X_2$ and path signal "1" inputted to the recognition unit n12 for covering the right half portion of the letter to be recognized is inputted to the path input terminal 1a1 of the recognition unit n23 of the second layer.

Then, the second characteristic vector data $Z_1$ of the letter data is inputted to the signal, input terminal 11a of the vector signal input section 11 of recognition units n21 and n22 and Z2 is inputted to the signal input terminal 11a of the vector signal input section 11 of recognition units n23 and n24. The recognition units n21, n22, n23 and n24 of the second layer transmit the path signals to the recognition units of the third layer by performing the same operation with that of the recognition units of the first layer. That is, in FIG. 12, path p21 is selected by the switch 1c according to the path selecting information obtained by vector-quantizing the characteristic vector data $Z_1$ and the path signal "1" inputted to the recognition unit n22 is inputted to the path input terminal 1a1 of the recognition unit n34 of the third layer. In the same manner, path p22 is selected by the switch 1c according to the path selecting information obtained by vector-quantizing the characteristic vector data $Z_2$ and the path signal "1" inputted to the recognition unit n23 is inputted to the path input terminal 1a1 of the recognition unit n36 of the third layer.

Here, the recognition units n31–n38 of the third layer is in a process of learning, and a teacher signal for indicating to which category among three categories the inputted letter data belongs, i.e. a signal indicating which recognition unit among recognition units n41–n43 should be selected, is inputted to the vector signal input terminal 11a of the recognition units n31–n38 of the third layer. That is, if the inputted reference letter is 'B', a vector signal by which n42 is selected is inputted. In FIG. 12, the teacher signal is inputted to two recognition units n34 and n36. In the recognition units n31–n38, the vector quantizer 21 initially converts the teacher signal into a path selecting information indicating to which path output terminal the path input terminal 1a1 should be connected in each recognition unit and then the switch 1c switches the connection between the path input terminal 1a1 and the path output terminals 1b1, 1b2 and 1b3 according to the path selecting information. That is, in FIG. 12, the switch 1c in the recognition units n34 end n36 selects paths p31 and p32 based on the path selecting information. Then the switch 1c is fixed to that selection. For other letters, the switch 1c is fixed in the same manner. Thus learning is consummated. By the way, recognition units n41, n42 and n43 of the fourth layer are not involved during the learning.

As described above, in the learning process of the recognizing and judging apparatus according to the first embodiment of the present invention shown in FIG. 12, various characteristic vector data of an object such as a letter is initially inputted to the vector signal input section 11 of each recognition unit constituting a multi-layered (the first and second layers in the figure) hierarchical network. Connection paths of the recognition units are switched according to an output value of the vector quantizer 21, i.e. a path selecting information. Then path signals are inputted to the path input section 1a of the recognition units of the first layer and according to the connections between the recognition units, the path signals are transmitted from the recognition units of the first layer to the recognition units of the layer (the third layer in the figure) preceding the lowermost layer. Here, a teacher signal indicating which recognition unit among recognition units of the lowermost layer which correspond to each category should be selected is inputted to the vector signal input section 11 of the recognition units of the layer preceding to the lowermost layer. Then the switch 1c changes the connection between the path input terminal and the path output terminals indicated by the path selecting information according to the teacher signal in each of the recognition units of the layer preceding the lowermost layer. The learning of the input pattern is thus carried out. That is, according to the recognizing and judging apparatus of the present embodiment, the templates (reference vectors) themselves need not be modified and the user can cause it to learn just by selecting the switch 1c of the recognition unit of the layer preceding the lowermost layer, so that it can perform learning at a very high speed as compare to the prior art examples.

Next, a recognition operation by the recognizing and judging apparatus shown in FIG. 12 will be described. In the recognition units n11, n12 and n21–n24 from the first layer to the second layer, similarly to the learning operation, the vector quantizer 21 in each of the recognition units vector quantizes characteristic vector data of an unknown letter inputted to the vector signal input section 11 into two levels to convert into a path selection signal for indicating to which path output terminal among two terminals in each recognition unit the inputted path signal should be transmitted and the switch 1c in the path signal transmitting section 1 switches the connection between each of the recognition units according to the path selecting information. Moreover, path signal "1" is inputted to the path input section 1a of each of the recognition units of the first layer and according to the connection of the aforementioned recognition units, the path signal are transmitted from the recognition units of the first layer to the recognition units of the layer (the third layer in the figure) preceding the lowermost layer. That is, in FIG. 12, the path signals are transmitted sequentially through the paths p11 and p12 and p21 and p22.

In the recognition operation, no teacher signal is inputted to the vector signal input terminal 11a of each of the recognition units n34 and n36 of the third layer. Accordingly, the state of the switches 1c during learning is maintained and the paths p31 and p32 are selected according to the state of these switches 1c, and the path signal "1" is transmitted to the path input terminal of the recognition unit n42 of the fourth layer. The adder 1a0 in the path input section 1a of the recognition unit n42 adds up the path signals inputted through the paths p31 and p32. Moreover, a signal "1" indicating a recognition mode is inputted to the signal input terminal 11a of the vector signal input section 11 of the recognition unit n42 and the vector quantizer 21 vector-quantizes this signal so that the path signal transmitter 1b may enable the path output. (A signal "0" is inputted during a learning mode and the path signal transmitting section 1 switches so that the path output is disabled. A path signal obtained through the addition is sent to the path output section 1b. In the path output section 1b, the threshold processor 1b0 performs threshold processed with respect to the signal and outputs the processed result to the path output terminal 1b1. Accordingly, when the value of the signal, after the addition, is greater than a certain threshold value, the signal is outputted through the path output terminal. In this way, the letter may be recognized based on the inputted characteristic data thereof. Sigmoid function, Step function or the like may be used as a function for performing the threshold processing.

As described above, in the recognizing process of the recognizing and judging apparatus according to the first embodiment of the present invention shown in FIG. 12, various characteristic vector data of an object such as a letter to be recognized are inputted to the signal input section of each recognition unit constituting a multi-layered hierarchical network. The connection path between the recognition units are switched according to an output value of respective vector quantizers 21. Then, a path signal is inputted to the path input section 1a of each of the recognition units of the first layer and is transmitted from the recognition units of the first layer to the recognition units of the layer (the third layer in the figure) preceding the lowermost layer according to the connections of the aforementioned recognition units. In the layer preceding the lowermost layer, a recognition result may be obtained only by determining the selection path to the lowermost layer (the fourth layer in the figure) based on the connection path set in the learning process. That is, in the recognizing and judging apparatus of the present embodiment, the input signal pattern of the object and all the templates, i.e. all the reference vectors, need not be compared and computed as in the prior art examples. In order to improve recognition performance of the prior art apparatus in particular, a plurality of templates needs to be provided for each category, so that an enormous amount of computation is required for the comparison and computation and it took much for recognition. Although the input signal vector and the reference vectors need to be compared and computed in each of the recognition units also in the recognizing and judging apparatus of the present invention, the number of reference vectors necessary for the comparison can be much less as compare to the prior art examples since recognition is carried out by combining each of the recognition units in the hierarchical manner as shown in FIG. 12. Since the time necessary for the comparison increases in proportional to the number of the reference vectors, the recognition process can be performed at a very high speed as compared to the prior art examples with the recognizing and judging apparatus of the present invention. Furthermore, the recognition speed can be faster since the object to be recognized is divided into right and left half portions of a network.

Although the vector quantizer 21 shown in FIG. 4 has been used for the recognition units constituting the first and second layers in the aforementioned embodiment of the recognizing and judging apparatus of,the present invention, the vector quantizer 21 shown in FIGS. 5 or 6 may be also used instead.

Figure 13:
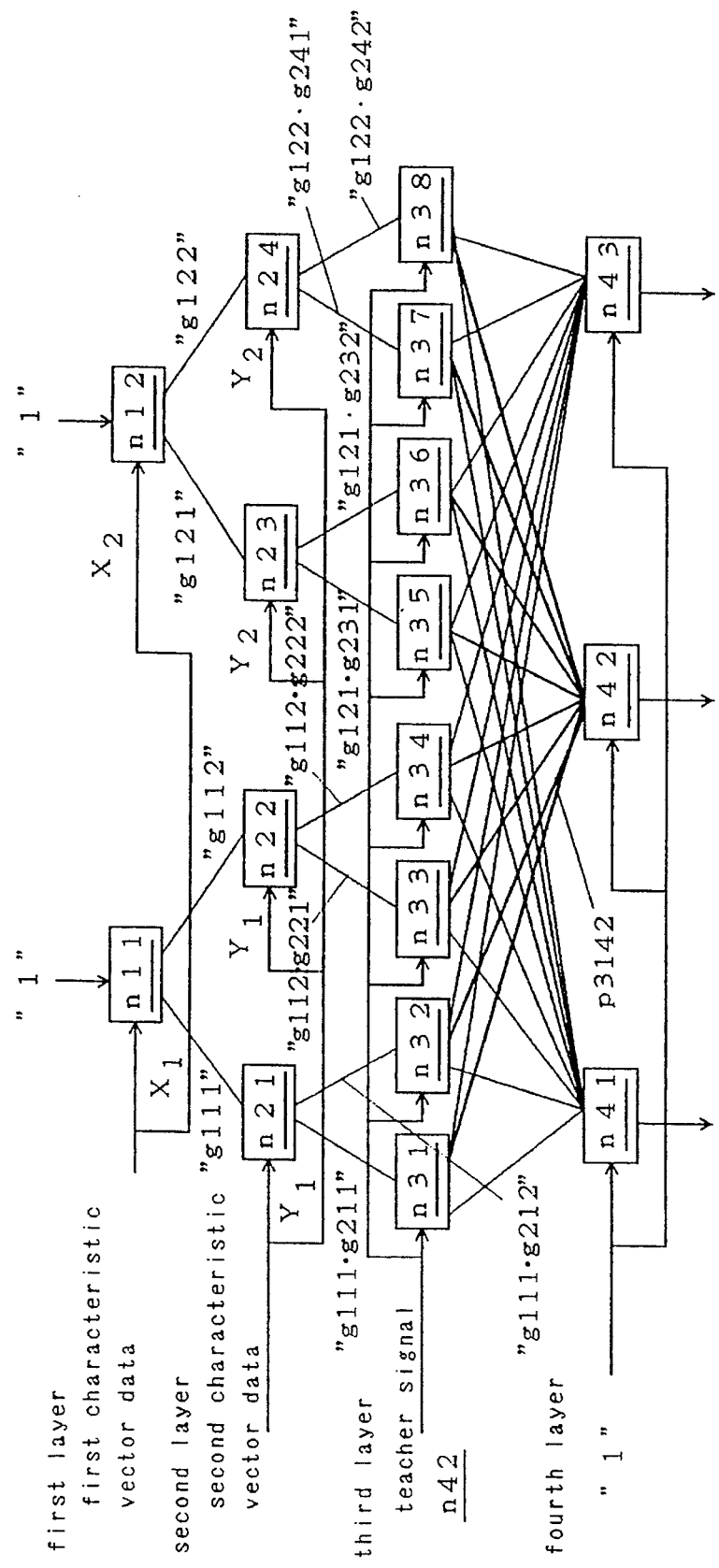
FIG. 13 is a block diagram of a recognizing and judging apparatus according to a second embodiment of the present invention.

FIG. 13 is a block diagram of a recognizing and judging apparatus according to a second embodiment of the present invention. Similarly to the recognizing and judging apparatus in FIG. 12, this recognizing and judging apparatus also classifies an object to be recognized into three categories based on two types of characteristic vector data of the object. A network is constructed in the same manner with the recognizing and judging apparatus in FIG. 12 by connecting a plurality of recognition units of the present invention with one another in a multi-layered hierarchical structure. In this embodiment, however, the recognition unit as shown in FIG. 7 is used as the recognition units n11 and n12 and n21–n24 constituting the first and second layers and comprises the path load information computing section 61 shown in FIG. 8 for converting characteristic vector data inputted from the vector signal input section 11 into two path load informations and the path signal transmitting section 1 provided with the path input section 1a having one path input terminal 1a1 , the path output section 1b having two path output terminals 1b 1 and 1b2 and the path load section 1c having two loads 1c1 and 1c2 for applying weight to a path signal inputted to the path input section 1a. The recognition unit shown in FIG. 7 is also used as the recognition units n31–n38 constituting the third layer and comprises here the path load information computing section 61 for converting a teacher signal inputted from the vector signal input section 11 into three path load informations and the path signal transmitting section 1 provided with the path input section 1a having one path input terminal 1a1 , the path output section 1b having three path output terminals 1b1 , 1b2 and 1b3 and the path load section 1c having three loads 1c1, 1c2 and 1c3 for applying weight to a path signal from the upper layer recognition unit inputted to the path input section 1a. The recognition unit as shown in FIG. 11 is used as the recognition units n41–n43 constituting the fourth layer and as described before, the path input section 1a is structured by the adder 1a0 for adding input signals from eight path input terminals 1a1–1a8 and the path output section 1b is structured by the threshold processor 1b0 for performing threshold processing on a path signal.

Next, a learning operation of the recognizing and judging apparatus shown in FIG. 13 will be described exemplifying a case when an object to be recognized is a letter and letter data is discriminated into three categories using two characteristic vector data of two types of letter data $X_1$, $X_2$, $Y_1$ and $Y_3$ as described in the description of the recognizing and judging apparatus according to the first embodiment shown in FIG. 12.

At first, the learning operation of the recognizing and judging apparatus will be described using those characteristic vector data $X_1$, $X_2$, $Y_1$ and $Y_3$.

"1" is initially given as a path signal to the path input section 1a of each of the recognition units n11 and n12 of the first layer. First characteristic vector data $X_1$ and $X_2$ of the letter data are also inputted to the signal input terminal 11a of the vector signal input section 11 of those units. In the path load information computing section 61 of the recognition units nil and n12, the inner product value computing section 73 computes an inner product value of two reference vectors stored in the reference vector storing section 72 and the characteristic vector data as described referring to FIG. 8 and the threshold processor 74 converts the characteristic vector data into two path load informations by performing threshold processing on the inner product value. That is, in the path load information computing section 61 of the recognition unit n11, the characteristic vector data $X_1$ is converted into a path load information ($wx_{11}$, $wx_{12}$) and in the path load information computing section 61 of the recognition unit n12, the characteristic vector data $X_2$ is converted into a path load information ($wx_{21}$, $wx_{22}$). In the path load section 1c of each of the recognition units, the loader 1c0 changes the loads 1c1 and 1c2 according to the path load informations and the inputted path signal to apply weight to the path signal inputted from the path input section 1a. The path output section 1b of each of the recognition units outputs the weighted path signal to the path input terminal of the recognition units of the mutually connected second layer, through the intermediary of the path output terminals 1b1 and 1b2. That is, the path signal "1" inputted in the recognition unit n11 is weighted by loads g111 and g112 defined according to the path signal and the path load information ($wx_1$, $wx_{12}$), and the weighted path signal "g111" is inputted to the recognition unit n21 whereas the path signal "g112" is inputted to the recognition unit n22. In the same way, the path signal "1" inputted in the recognition unit n12 is weighted by loads g121 and g122 defined according to the path signal and the path load information ($wx_{21}$, $wx_{22}$), and the weighted path signal "g121" is inputted to the recognition unit n23 whereas the path signal "g122" is inputted to the recognition unit n24.

Next, the second characteristic vector data $Y_1$ of the letter data is inputted to the signal input terminal 11a of the vector signal input section 11 of the recognition units n21 and n22 of the second layer, and $Y_2$ is inputted to the vector signal input terminal 11a of the vector signal input section 11 of the recognition units n23 and n24. Each of the recognition units of the second layer transmits the path signal to the recognition units of the third layer by performing the similar operations with those of the recognition unit of the first layer. In the path load information computing section 61 of the recognition units n21 and n22 in FIG. 13, the characteristic vector data $Y_1$ is first converted into path load informations (wy11, wy12) and (wy$_{13}$, wy$_{14}$), respectively, and in the path load information computing section 61 of the recognition units n23 and n24, the characteristic vector data $Y_2$ is converted into path load informations (wy$_{11}$, wy$_{12}$) and (wy$_{13}$, wy$_{14}$), respectively. Then the path signal "g111" inputted to the recognition unit n21 is weighted by loads g211 and g212 defined according to the path signal and the path load information (wy$_{11}$, wy$_{12}$) and the weighted path signal "g111*g211" is inputted to recognition unit n31 and the path signal "g111*g212" is inputted to recognition unit n32. Moreover, the path signal "g112" inputted to the recognition unit n22 is weighted by loads g211 and g212 defined according to the path signal and the path load information (wy$_{13}$, wy$_{14}$) and the weighted path signal "g112*g221" is inputted to recognition unit n33 and the path signal "g112*g222" is inputted to recognition unit n34. In the same way, the path signal. "g121" inputted to the recognition unit n23 is weighted by, loads g231 and g232 defined according to the path signal and the path load information (wy$_{21}$, wy$_{22}$) and the weighted path signal "g121*g231" is inputted to recognition unit n35 and the path signal "g121*g232" is inputted to recognition unit n36, and the path signal "g122" inputted to the recognition unit n24 is weighted by loads g241 and g242 defined according to the path signal and the path load information (wy$_{23}$, wy$_{24}$) and the weighted path signal "g122*g241" is inputted to recognition unit n37 and the path signal "g122*g242" inputted to recognition unit n38.

Here, a teacher signal for indicating to which category among three categories the inputted letter data belongs, i.e. a signal indicating which recognition unit among recognition units n41–n43 should be selected, is inputted to the vector signal input section 11 of the recognition units n31–n38. The path load information computing section 61 of each of the recognition units n31–n38 converts the inputted teacher signal to a path load information indicating the strength of which connection of path output terminal with the path input section 1a of each of the recognition units should be changed, i.e. which load in the path load section 1c should be changed. In the path load section 1c of the recognition units n31–n38, the loader 1c0 changes the load indicated by the path load information according to the path signal inputted from the path input section. In the embodiment in FIG. 13 for example, if a teacher signal for selecting the recognition unit n42 is inputted to the vector signal input section 11 of the recognition units n31–n38, load g312 of the recognition unit n31 indicating the strength of a connection of path p3142 changes according to the input path signal "g111*g211". That is, load g3i2 (i=1 through 8) of recognition unit n3i (i=1 through 8) indicating the strength of the connection of path p3i42 (1=1 through 8) changes according to the path signal inputted to these recognition units.

As described above, in the learning process of the recognizing and judging apparatus according to the second embodiment of the present invention shown in FIG. 13, various characteristic vector data of an object such as a letter is initially inputted to the vector signal input section 11 of each of the recognition units constituting a multi-layered (the first and second layers in the figure) hierarchical network. Loads of connection paths of recognition units are changed according to path load informations obtained from the path load information computing section 61 of each of the recognition units. Then a path signal is inputted to the path input section 1a of each of the recognition unit of the first layer and according to the strength of the connection between the aforementioned recognition units, the path signal is transmitted from the recognition units of the first layer to the recognition units of the layer (the third layer in the figure) preceding the lowermost layer. Here, a teacher signal indicating which recognition unit among recognition units of the lowermost layer which correspond to each category should be selected is inputted to the vector signal input section 11 of the layer preceding to the lowermost layer. Then the loader 1c0 changes the strength (load) of the connection between the path input terminal and the path output terminals indicated by the path load information according to the teacher signal in each of the recognition unit of the layer preceding to the lowermost layer. The learning of the input pattern is thus carried out. That is, according to the recognizing and judging apparatus of the present embodiment, the templates (reference vectors) themselves need not be modified as in the prior art examples, so that the recognizing and judging apparatus of the present embodiment can perform the learning at a very high speed as compare to prior art examples.

Next, a recognition operation by the recognizing and judging apparatus shown in FIG. 13 will be described. In the recognition units n11, n12 and n21–n24 from the first layer to the second layer, similarly to the learning operation, the path load information computing section 61 in each of the recognition units converts characteristic vector data of an unknown letter inputted to the vector signal input section 11 into path load information for indicating how to weight an inputted path signal to transmit it to two path output terminals in each of the recognition units and changes the strength of the connection of each of the recognition units (i.e. load of the path load section 1c in each of the recognition units) based on the path load information and the path signal. Moreover, path signal "1" is inputted to the path input section 1a of each of the recognition units of the first layer and according to the strength of the connection of the aforementioned recognition units, the path signal is transmitted from the recognition units of the first layer to the recognition unit of the layer (the third layer in the figure) preceding the lowermost layer.

In the recognition operation, no teacher signal is inputted to the vector signal input terminal of each of the recognition units n31–n38 of the third layer. Accordingly, the state of the load during learning is kept and the path signals inputted to each of the recognition units of the third layer are weighted by those loads and are transmitted to the path input terminal of all the recognition units n41–n43 of the final layer (the fourth layer in the figure). The adder 1a0 in the path input section 1a of the recognition units n41–n43 adds all the inputted path signals. A signal "1" indicating a recognition mode is inputted to the signal input terminal 11a of the vector signal input section 11 of each of the recognition units of the fourth layer and the path load information computing section 61 converts this signal to a path load information so that the path signal transmitter 1c may enable the path output. (When a signal "0" is inputted, the path signal transmitter 1c switches so that path output is disabled.) A path signal obtained through addition is sent to the path output section 1b. In the path output section 1b, the threshold processor 1b0 performs threshold processing on the signal and outputs the processing result to the path output terminal 1b1. Accordingly, when the value of the signal after the addition is greater than a certain threshold value, the signal is outputted through the path output terminal. In this way, the letter may be recognized based on the inputted characteristic data thereof.

As described above, in the recognizing process of the recognizing and judging apparatus according to the second embodiment of the present invention shown in FIG. 13, various characteristic vector data of an object such as a letter to be recognized are inputted to the signal input section 11 of each of the recognition unit constituting a multi-layered (the first and second layers in the figure) hierarchical network. The load of the connection paths between the recognition units is changed according to an output value of the path load information computing section 61, i.e. a path load information. Then, a path signal is inputted to the path input section 1a of each of the recognition units of the first layer and the path signal is transmitted from the recognition units of the first layer to the recognition units of the layer (the third layer in, the figure) preceding the lowermost layer according to the strength of the connections of the aforementioned recognition units. In the layer preceding the lowermost layer (the third layer in this figure), a recognition result may be obtained only by determining the selection path to the lowermost layer (the fourth layer in the figure) based on the load of the connection path set in the learning process. That is, in the recognizing and judging apparatus of the present embodiment, the input signal pattern of the object and all the templates, i.e. all the reference vectors, need not be compared and computed as in the prior art examples. In order to improve recognition performance of the prior art apparatus in particular, a plurality of templates needs to be provided for each category, so that an enormous amount of computation is required for the comparison and computation and it takes much time for making the recognition. Although the input signal vector and the reference vectors need to be compared and computed in each of the recognition units also in the recognizing and judging apparatus of the present invention when the input signal vector is converted into the path load information, the number of the reference vectors necessary per each recognition unit may be much less as compare to the prior art examples since the recognition is carried out by combining a plurality of recognition units in the hierarchical manner as shown in FIG. 13. Since the time necessary for the comparison increases in proportional to the number of the reference vectors, the recognition process can be performed at a very high speed as compared to the prior art examples with the recognizing and judging apparatus of the present invention.

Although the path load information computing section 61 shown in FIG. 8 has been used for the recognition units constituting the first and second layers in the aforementioned embodiment of the recognizing and judging apparatus of the present invention, the path load information computing section 61 shown in FIGS. 9 or 10 may be used instead.

Furthermore, the fourth layer may be omitted and in such a case, one tree system (n11, n21, n22, n31, n32, n33 and n34) would be an object to be recognized and letter labels of 'A', 'B' and 'C' are labeled to n31,n32, n33 and n34, respectively.

In the case when the fourth layer is missing as here, the modified unit as described, referring to FIG. 11, may be of course used as the fourth layer or the recognition unit of the present invention may be used as the fourth layer.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means includes a vector quantizer for converting said input signal vector to said path signal transmitting information by performing vector-quantization on said input signal vector from said vector signal input means;

said path signal transmitting means includes path input means having said one or more path input terminals for inputting said path signal, path output means having said one or more path output terminals for outputting said path signal, and switch means for switching the connection between said path input terminals of said path input means and said path output terminals of said path output means according to said path signal transmitting information; and said vector quantizer comprises:
reference vector storing means for storing a plurality of reference vectors indicating a representative value of an input signal vector in which a plurality of input signals are combined;
a plurality of distance computing means for computing distances between said input signal vector and all said reference vectors stored in said reference vector storing means and generating output signals indicative of the computed distances; and
minimum value selecting means for selecting a minimum value among all the output signals of said distance computing means.

2. The recognizing and judging apparatus in accordance with claim 1, wherein:

said plurality of recognition units comprise said path input means provided with an adder for adding input signals from a plurality of path input terminals to one another and said path output means provided with a threshold processor for performing threshold processing on output signals of said adder; said plurality of recognition units comprising said lowermost layer in said multi-layered hierarchical network structure.

3. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means includes a vector quantizer for converting said input signal vector to said path signal transmitting information by performing vector-quantization on said input signal vector from said vector signal input means;

said path signal transmitting means includes path input means having said one or more path input terminals for inputting said path signal, path output means having said one or more path output terminals for outputting said path signal, and switch means for switching the connection between said path input terminals of said path input means and said path output terminals of said path output means according to said path signal transmitting information; and said vector quantizer comprises:

reference vector storing means for storing a plurality of reference vectors indicating a representative value of an input signal vector in which a plurality of input signals are combined;

a plurality of inner product value computing means for computing inner product values of said input signal vector and all said reference vectors stored in said reference vector storing means and generating output signals indicative of the computed values; and maximum value selecting means for selecting a maximum value among all the output signals of said inner product value computing means.

4. The recognizing and judging apparatus in accordance with claim 3, wherein:

said plurality of recognition units comprise said path input means provided with an adder for adding input signals from a plurality of path input terminals to one another and said path output means provided with a threshold processor for performing threshold processing on output signals of said adder; said plurality of recognition units comprising said lowermost layer in said multi-layered hierarchical network structure.

5. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means includes a vector quantizer for converting said input signal vector to said path signal transmitting information by performing vector-quantization on said input signal vector from said vector signal input means;

said path signal transmitting means includes path input means having said one or more path input terminals for inputting said path signal, path output means having said one or more path output terminals for outputting said path signal, and switch means for switching the connection between said path input terminals of said path input means and said path output terminals of said path output means according to said path signal transmitting information; and said vector quantizer comprises:

a plurality of scalar quantizers for converting said input signal vector to indexes of quantized output signals in each dimension by quantizing each element of said input signal vector; and path information integrating means for integrating said plurality of indexes into one to produce a path selecting information.

6. The recognizing and judging apparatus in accordance with claim 5, wherein:

said plurality of recognition units comprise said path input means provided with an adder for adding input signals from a plurality of path input terminals to one another and said path output means provided with a threshold processor for performing threshold processing on output signals of said adder; said plurality of recognition units comprising said lowermost layer in said multi-layered hierarchical network structure.

7. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means is provided with path load information computing means for converting said input signal vector from said vector signal inputting means into a path load information;

said path signal transmitting means comprises path input means having one or more path input terminals for inputting said path signal, path output means having one or more path output terminals for outputting said path signal and path load means for switching the connection between said path input terminals of the path input means and said path output terminals of the path output means according to said path signal inputted from said path input means and said path load information; and said path load information computing means comprises:

reference vector storing means for storing a plurality of reference vectors indicating a representative value of an input signal vector in which a plurality of input signals are combined;

a plurality of inner product value computing means for outputting inner product values of said input signal vector and all said reference vectors stored in said reference vector storing means; and a plurality of threshold processors for performing threshold processing on said inner product value.

8. The recognizing and judging apparatus in accordance with claim 7, wherein:

said plurality of recognition units comprise said path input means provided with an adder for adding input signals from a plurality of path input terminals to one another and said path output means provided with a threshold processor for performing threshold processing on output signal of said adder; said plurality of recognition units comprising said lowermost layer in said multi-layered hierarchical network structure.

9. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means is provided with path load information computing means for converting said input signal vector from said vector signal inputting means into a path load information;

said path signal transmitting means comprises path input means having one or more path input terminals for inputting said path signal, path output means having one or more path output terminals for outputting said path signal and path load means for switching the connection between said path input terminals of the path input means and said path output terminals of the path output means according to said path signal inputted from said path input means and said path load information; and said path load information computing means comprises:

reference vector storing means for storing a plurality of reference vectors indicating a representative value of an input signal vector in which a plurality of input signals are combined;

a plurality of distance computing means for computing distances between said input signal vector and all said reference vectors stored in said reference vector storing means and generating an output indicative thereof;

a plurality of first dividers for computing an inverse number of the output of said distance computing means and generating an output indicative thereof;

an adder for adding each output of said dividers;

a plurality of multipliers for multiplying an output of said adder by the outputs of said distance computing means;

a plurality of second dividers for computing an inverse number of an output of said multipliers and generating an output indicative thereof; and a plurality of threshold processors for performing threshold processing on the outputs of said second dividers.

10. The recognizing and judging apparatus in accordance with claim 9, wherein;

said plurality of recognition units comprise said path input means provided with an adder for adding input signals from a plurality of path input terminals to one another and said path output means provided with a threshold processor for performing threshold processing on output signals of said adder; said plurality of recognition units comprising said lowermost layer in said multi-layered hierarchical network structure.

11. A recognizing and judging apparatus including a plurality of recognition units in a multi-layered hierarchical network structure having an upper layer and a lower layer, with one or more path output terminals of said recognition units of the upper layer being connected with one or more path input terminals of said recognition units of the lower layer, each said recognition unit comprising:

vector signal input means for inputting a plurality of input signals having characteristics of an object to be recognized;

path signal transmitting information computing means connected to said vector signal input means for converting an input signal vector from said vector signal input means into path signal transmitting information; and path signal transmitting means connected to said path signal transmitting information computing means and having said one or more path input terminals for inputting a path signal and said one or more path output terminals for outputting said path signal to transmit said path signal from said path input terminals to said path output terminals according to said path signal transmitting information, wherein:

said path signal transmitting information computing means is provided with path load information computing means for converting said input signal vector from said vector signal inputting means into a path load information;

said path signal transmitting means comprises path input means having one or more path input terminals for inputting said path signal, path output means having one or more path output terminals for outputting said path signal and path load means for switching the connection between said path input terminals of the path input means and said path output terminals of the path output means according to said path signal inputted from said path input means and said path load information; and said path load information computing means comprises:

reference vector storing means for storing a plurality of reference vectors indicating a representative value of an input signal vector in which a plurality of input signals are combined;

covariance matrix storing means for storing a plurality of covariance matrixes indicating an extent of said input signal vector that corresponds to all said reference vectors;

Gaussian function value computing means for converting said input signal vector into a value of probability density function having multi-dimensional Gaussian distribution using said reference vectors and covariance matrixes stored respectively in said reference vector storing means and said covariance matrix storing means; and a plurality of threshold processors for performing threshold processing on the probability density function output of said Gaussian function value computing means.

12. The recognizing and judging apparatus in accordance with claim 11, wherein:

said plurality of recognition units comprise said path input means provided with an adder for adding input signals from a plurality of path input terminals to one another and said path output means provided with a threshold processor for performing threshold processing on output signals of said adder; said plurality of recognition units comprising said lowermost layer in said multi-layered hierarchical network structure.

* * * * *

UNITED STATES PATENT AND TRADEMARK OFFICE
CERTIFICATE OF CORRECTION

PATENT NO. : 5,530,886
DATED : June 25, 1996
INVENTOR(S) : Yoshihiro Kojima et al It is certified that error appears in the above-indentified patent and that said Letters Patent is hereby corrected as shown below:

"Fig. 8" of the drawings should be --Fig. 10--, and "Fig. 10" should be --Fig. 8--.

Signed and Sealed this

Twenty-first Day of January, 1997

Attest:

BRUCE LEHMAN

*Attesting Officer*     *Commissioner of Patents and Trademarks*